(12) United States Patent
Yokoyama et al.

(10) Patent No.: US 10,824,063 B2
(45) Date of Patent: Nov. 3, 2020

(54) IMAGE PROJECTION DEVICE AND PLANETARIUM

(71) Applicant: Konica Minolta, Inc., Chiyoda-ku, Tokyo (JP)

(72) Inventors: Mitsuru Yokoyama, Takatsuki (JP); Hiroaki Ueda, Suita (JP)

(73) Assignee: Konica Minolta, Inc., Tokyo (JP)

( * ) Notice: Subject to any disclaimer, the term of this patent is extended or adjusted under 35 U.S.C. 154(b) by 306 days.

(21) Appl. No.: 16/060,074

(22) PCT Filed: Nov. 30, 2016

(86) PCT No.: PCT/JP2016/085487
§ 371 (c)(1),
(2) Date: Jun. 7, 2018

(87) PCT Pub. No.: WO2017/098973
PCT Pub. Date: Jun. 15, 2017

(65) Prior Publication Data
US 2018/0335686 A1 Nov. 22, 2018

(30) Foreign Application Priority Data

Dec. 9, 2015 (JP) .................................. 2015-240342
Mar. 4, 2016 (JP) .................................. 2016-041803

(51) Int. Cl.
*G03B 21/20* (2006.01)
*G02B 27/18* (2006.01)
(Continued)

(52) U.S. Cl.
CPC ........... *G03B 21/2033* (2013.01); *G02B 5/18* (2013.01); *G02B 5/1814* (2013.01);
(Continued)

(58) Field of Classification Search
CPC ........ G03B 21/28; G03B 21/60; G03B 21/62; G03B 21/567; G02B 5/08; G02B 5/12;
(Continued)

(56) References Cited

U.S. PATENT DOCUMENTS 7,755,718 B2 * 7/2010 Amako ................ G02B 5/1809
349/5
2002/0027678 A1 3/2002 Halldorsson et al.
(Continued)

FOREIGN PATENT DOCUMENTS

JP 2002-062415 A 2/2002
JP 2002-508848 A 3/2002
(Continued)

OTHER PUBLICATIONS

Notice of Reasons for Refusal issued in corresponding Japanese Patent Application No. 2016-041803, dated Jan. 28, 2020, with English Translation (6 pages).
(Continued)

*Primary Examiner* — Sultan Chowdhury
(74) *Attorney, Agent, or Firm* — Buchanan Ingersoll & Rooney PC

(57) ABSTRACT

In an image projection device including a laser beam source and a diffractive optical element provided on an optical path of a laser beam L from the laser beam source, a transparent
(Continued)

member having a refractive index higher than that of an area ahead of an emission surface on the optical path of the laser beam L and a diffractive optical element is formed on an emission surface of the transparent member. The laser beam L is obliquely incident on the diffractive optical element. The diffractive optical element generates a diffraction image in an area which is not overlapped with zeroth order light LR of the laser beam L and an area occupied by a conjugate image, and is arranged in a direction to irradiate a screen with diffracted light forming the diffraction image while substantially eliminating the zeroth order light and the diffracted light forming the conjugate image.

20 Claims, 40 Drawing Sheets

(51) Int. Cl.
  *G09B 27/00* (2006.01)
  *G02B 5/18* (2006.01)
(52) U.S. Cl.
  CPC .......... *G02B 5/1842* (2013.01); *G02B 27/18* (2013.01); *G09B 27/00* (2013.01)
(58) Field of Classification Search
  CPC .......... G02B 5/18; G02B 5/124; G02B 5/136; G02B 5/1814; G02B 5/1842; G09B 27/00; G09B 27/18; G09B 27/58; G09B 27/0944
  See application file for complete search history.

(56) References Cited

U.S. PATENT DOCUMENTS

| 2003/0155495 A1* | 8/2003 | Drinkwater | G06K 19/16 250/237 R |
|---|---|---|---|
| 2009/0273762 A1 | 11/2009 | Ohira | |
| 2013/0001207 A1 | 1/2013 | Nomaru | |
| 2015/0253657 A1* | 9/2015 | Hajjar | G03B 21/58 359/461 |

FOREIGN PATENT DOCUMENTS

| JP | 2006-308785 A | 11/2006 |
|---|---|---|
| JP | 2013-013912 A | 1/2013 |
| JP | 2013-522667 | 6/2013 |
| JP | 2013-522667 A | 6/2013 |
| JP | 2013-190394 A | 9/2013 |
| WO | 2016072483 | 5/2016 |

OTHER PUBLICATIONS

International Search Report (Form PTC/ISA/210) dated Jan. 31, 2017, by the Japanese Patent Office in corresponding International Application No. PCT/JP2016/085487. (5 pages).
Written Opinion of the International Searching Authority (Form PCT/ISA/237) dated Jan. 31, 2017, by the Japanese Patent Office in corresponding International Application No. PCT/JP2016/085487. (9 pages).
Notice of Reasons for Refusal issued in corresponding Japanese Patent Application No. 2015-240342, dated Aug. 27, 2019, with English Translation (8 pages).

* cited by examiner

IMAGE PROJECTION DEVICE AND PLANETARIUM

TECHNICAL FIELD

The present invention relates to an image projection device which projects an image on a screen, and a planetarium using the same. In more detail, this relates to an image projection device which uses a laser beam and generates to project an image by a diffraction phenomenon based on the laser beam and a planetarium.

BACKGROUND ART

Conventionally, an image projection device that forms a projected image by diffracting a laser beam by a diffractive optical element is used for a planetarium or the like. In this type of image projection device, a diffractive optical element 1 as illustrated in FIG. 1 is used. The diffractive optical element 1 is a flat plate-shaped member having a two-dimensional concavo-convex pattern formed thereon. In FIG. 1, a checkered pattern in which irregularities are simply alternately arranged is illustrated, but this is only an example, and actual arrangement pattern of irregularities is arbitrary. When a coherent laser beam (incident light) is allowed to be incident on the diffractive optical element 1, on a back surface side thereof, in addition to (0, 0) order light being direct transmitted light, diffracted light of each order is obtained according to Bragg's law. However, depending on the diffraction order, diffracted light may not appear due to a disappearing rule. The laser beam of the diffraction order which does not disappear forms a bright point on a screen, and an angular position to which the laser beam of the disappeared order should be directed forms a dark spot on the screen. Specifically, the order with which the diffracted light appears and the order with which the diffracted light disappears depends on a result of Fourier transform of the concavo-convex pattern. That is, it depends on the concavo-convex pattern.

Therefore, it is configured such that the diffracted light of the order corresponding to a point representing a target picture appears, and diffracted light of the other order disappears. For example, a case where a picture as illustrated in FIG. 2 is represented by the diffractive optical element 1 is considered. As illustrated in FIG. 3 being an enlarged view of a part A in FIG. 2, the picture is formed of individual coordinate points. These individual coordinate points are expressed by bright points (spots) by the diffracted light which does not disappear. That is, each coordinate point in FIG. 3 has a two-dimensional order (m, n) (refer to FIG. 4). The coordinate point which should be present in an underlying portion in FIG. 3 corresponds to the order which disappears according to the disappearing rule of the concavo-convex pattern and becomes the dark point. Then, the concavo-convex pattern in which all the coordinate points forming the picture appear as the diffracted light and all the coordinate points corresponding to the underlying portion disappear is calculated by computer calculation, and the diffractive optical element 1 reproducing the concavo-convex pattern is manufactured (refer to FIG. 5). By allowing the laser beam to be incident on the diffractive optical element 1 in FIG. 5, the picture as illustrated in FIG. 2 may be projected. This is widely referred to as a computer generated hologram (CGH). That is, the picture in FIG. 2 is defined as a shape of a spot group by the diffracted light.

As a conventional technology using such diffractive optical element, there is one disclosed in Patent Literature 1. The technology of the literature is intended not to project an image for viewing but to irradiate an object to be processed with a laser beam; in FIG. 2, a diffractive optical element is represented by "633" (refer to [0023] in this literature). In the technology of this literature, as illustrated in FIG. 2, the laser beam passing through the diffractive optical element 633 is passed through two prisms 635 and 636. Then, as the laser beam comes across a gap of an interval s between the two prisms 635 and 636, direct transmitted light (zeroth order light) is reflected and only diffracted light (primary light) is directed to a workpiece W. Therefore, angle separating coating is applied to a surface 636a of the prism 636 opposed to the prism 635 (refer to [0025] of this literature).

Another conventional technology is disclosed in Patent Literature 2. In the technology of this literature, a pattern is projected on an object to be measured for measuring a distance; in FIG. 1, a diffractive optical element is represented by "4" (refer to [0012] in this literature). In the technology of this literature, as illustrated in FIG. 2, a multi-stage diffractive optical element is used. Also, in (b) of FIG. 8 of this literature, an arrangement in a positional relationship avoiding zeroth-order light is disclosed (refer to [0019] of this literature).

As an example of still another conventional image projection device, there is one disclosed in Patent Literature 3. In the image projection device of this literature, a projected image is generated using a "transmission original plate" ([0010] and the like in this literature). Then, by moving the transmission original plate, the projected image is changed. In this literature, specifically, the movement of the transmission original plate reproduces the diurnal motion of the star ([0012]), and reproduces the starry skies at different positions on the Earth ([0013]).

CITATION LIST

Patent Literature

Patent Literature 1: JP 2013-013912 A
Patent Literature 2: JP 2013-190394 A
Patent Literature 3: JP 2006-308785 A

SUMMARY OF INVENTION

Technical Problem

However, the above-described conventional technology has the following problem. As illustrated in FIG. 6, the projected image by the diffractive optical element 1 includes a zeroth order light image 3 and a conjugate image 4 in addition to a direct image 2 which is an intended picture. The zeroth order light is (0, 0) order light illustrated in FIG. 1. For (1, 0) order light and (0, 1) order light in FIG. 1, (−1, 0) order light and (0, −1) order light are referred to as conjugate diffracted light. In a case where the diffractive optical element 1 is formed such that the direct image 2 is formed of (1, 0) order light or (0, 1) order light, the conjugate image 4 by the conjugate diffracted light is also formed together. The conjugate image 4 is formed in a position obtained by rotating the direct image 2 by 180° around a position of the zeroth order light image 3. Both the zeroth order light and the conjugate image 4 may be removed by placing a shielding plate 12 between a projection device 10 and a screen 11 as illustrated in FIG. 7, but this might cause an increase in size of the projection device. As illustrated in FIG. 8, since optical paths of the laser beams after emission are overlapped with each other within a distance D, it is necessary to place the shielding plate at a distance longer than D.

First, as for the zeroth order light, it is not appropriate to use this as a part of a picture. This is because the zeroth order light is direct transmitted light and is therefore significantly stronger than the diffracted light. The technology of Patent Literature 1 described above is the technology of eliminating the zeroth order light, and the angle separation coating is used for that purpose. This is based on the fact that interference of light by a thin film has angle dependency, but if film thickness accuracy of the thin film is low, the zeroth order light cannot be completely eliminated. In order to eliminate the zeroth order light to such an extent as to be usable for image viewing, significantly high film thickness accuracy is required, which is not realistic.

Next, the conjugate image 4 cannot be eliminated by the technology of Patent Literature 1. Although it is conceivable to form such a picture that it is recognized as one in the whole of the direct image 2 and the conjugate image 4, this is limited to a picture point symmetric across the position of the zeroth order light image 3. On the other hand, if it is assumed that a multi-stage diffractive optical element is used as in Patent Literature 2, it is possible to design a concavo-convex pattern such that the direct image 2 remains and the conjugate image 4 disappears by the calculation, but there still is a problem of work accuracy. This is because it is necessary to form a multi-stage pattern in a stage comparable to a wavelength of the laser beam to be used. For this reason, in the multi-stage diffractive optical element manufactured by an ordinary processing technology, the conjugate image 4 does not completely disappear but remains slightly. If the background is dark like a planetarium, presence of the conjugate image 4 is clearly seen. Meanwhile, the technology of Patent Literature 2 is of course ineffective for the removal of the zeroth order light.

Also, by applying the technology of Patent Literature 3 to provide two or more areas in the transmission original plate, it is possible to switch and project two or more different images. However, when trying to do such things actually, there is the following trouble. That is, an incomplete image is projected during image switching. The incomplete image is a projected image in which a right half of one image appears in a left half of a projection area and a left half of the other image appears in a right half of the projection area. This is not the originally intended projected image, and is a very boring projected image from the perspective of the viewer. In order to prevent such an image from being projected, a light source is temporarily turned off during image switching. However, this also is boring presentation from the viewer's perspective.

The present invention is achieved in order to solve the problem of the conventional technology described above. That is, an object thereof is to provide an image projection device and a planetarium capable of eliminating zeroth order light and a conjugate image with a simple configuration and projecting only an originally intended direct image on a screen while using diffraction of a laser beam. Alternatively, this is to provide an image projection device and a planetarium capable of not only switching to project two or more different images but also projecting individual images in their original projection positions even during image switching.

Solution to Problem

An image projection device according to an aspect of the present invention is provided with a laser beam source which outputs a laser beam, and a diffractive optical element provided on an optical path of the laser beam output from the laser beam source (hereinafter, referred to as an original laser beam) which generates diffracted light based on diffraction of the laser beam, the device that projects a diffraction image defined as a shape of a spot group by the diffracted light on a screen, including a transparent member arranged on the optical path of the original laser beam, including an incident surface and an emission surface which are flat surfaces, having a refractive index higher than that of an area ahead of the emission surface, and is transparent to the laser beam, in which the transparent member includes the diffractive optical element formed on the emission surface, and is arranged such that the original laser beam is obliquely incident on the diffractive optical element, and the diffractive optical element generates the diffraction image in an area not overlapped with zeroth order light of the incident laser beam and not overlapped with an area occupied by a conjugate image, and is arranged in a direction to irradiate a screen with the diffracted light forming the diffraction image while substantially eliminating the zeroth order light and the diffracted light forming the conjugate image.

In the image projection device in the above-described aspect, the original laser beam passes inside the transparent member to be incident on the diffractive optical element on the emission surface thereof. The diffracted light generated there forms the projected image to the area ahead of the emission surface. Herein, there is a difference in refractive index between inside and outside the emission surface, and the incidence of the original laser beam to the diffractive optical element on the emission surface is inclined. Therefore, the zeroth order light based on the original laser beam is not emitted from the emission surface to the area ahead thereof, or is emitted in an off-centered direction in all the laser beams emitted from the emission surface to the area ahead thereof. Depending on the direction in which the diffractive optical element is arranged, at least most of the laser beam emitted from the emission surface to the area ahead thereof is occupied by the diffracted light forming the target diffraction image. This makes it possible to project an excellent image from which an effect of the zeroth order light or the conjugate image are eliminated or reduced as much as possible. The diffractive optical element in this image projection device is arranged in the direction such that the area occupied by the diffraction image when the laser beam is perpendicularly incident is located on a side lower than the position of the zeroth order light at the time of the perpendicular incidence of the laser beam with respect to a maximum inclination direction of the emission surface.

In the above, it is desirable that a total reflection condition for the original laser beam is satisfied on the emission surface, and the diffractive optical element is arranged in a direction in which the diffracted light forming the diffraction image is entirely included in an area where the light may be emitted from the transparent member even under the total reflection condition and the diffracted light forming the conjugate image is not included. As a result, it is possible to completely eliminate the zeroth order light and the diffracted light forming the conjugate image from the laser beam emitted from the emission surface to the area ahead thereof.

Also, it is desirable that the transparent member includes non-parallel incidence surface and emission surface. As a result, even when incidence of the original laser beam on the incident surface is perpendicular, the incidence on the emission surface of the original laser beam may be made oblique incidence. For example, this may be realized by using a triangle pole prism as the transparent member. In the above-described aspect, the minimum number of stages of two of the diffractive optical element is sufficient.

In the image projection device according to another aspect of the present invention, the diffractive optical element is provided with a first diffraction grating area for generating a first diffraction image and a second diffraction grating area for generating a second diffraction image, a projection mode switching unit which performs mode switching for the projection of the diffraction image by the diffractive optical element is included, and a projection mode switched by the projection mode switching unit includes a single image mode in which the diffraction image is projected using only one of the first diffraction grating area and the second diffraction grating area, and an overlapped image mode in which the diffraction image is projected using both the first diffraction grating area and the second diffraction grating area.

In the image projection device in the above aspect, the first diffraction image may be projected on the screen by using only the first diffraction area of the diffractive optical element. It is also possible to project the second diffraction image on the screen by using only the second diffraction area. They correspond to the single image mode. Herein, since the image projected on the screen is the diffraction image, even when the image to be projected is being switched, the position of each image remains in its original projected position. Therefore, images may be switched naturally without causing the viewer to feel uncomfortable. Also, it is possible to easily perform the overlapped image mode in which the diffraction image is projected using both the first diffraction area and the second diffraction area.

In the image projection device according to the above aspect, the projection mode switching unit preferably performs mode switching by moving the diffractive optical element in an in-plane direction intersecting with the optical path of the laser beam output from the laser oscillating unit. Due to such movement of the diffractive optical element, the projected diffraction image may disappear without movement of the position, or the diffraction image which has not been projected may appear in its original position from the beginning.

When the mode switching is performed by the movement of the diffractive optical element in this manner, since the laser beam irradiates both the first diffraction grating area and the second diffraction grating area during transition from a first single image mode in which the first diffraction grating area is used to a second single image mode in which the second diffraction grating area is used by the movement of the diffractive optical element, the projection of the overlapped image mode may be performed. In this manner, the overlapped image mode may be realized with one laser beam. Also, the transition from the first single image mode to the second single image mode may be performed naturally with the overlapped image mode interposed therebetween.

In the image projection device according to the above aspect, the laser oscillating unit may have a plurality of emitting units from which the laser beam is emitted. In this case, the projection mode switching unit may switch the mode by switching the emitting unit to be used out of the plurality of emitting units. Even with such selective use of the emitting unit, the projected diffraction image may disappear without movement of the position, or the diffraction image which has not been projected may appear in its original position from the beginning.

In the case in which a plurality of emitting units is included, there preferably is one arranged in a position where the emitted laser beam irradiates both the first diffraction grating area and the second diffraction grating area. In this case, it is possible to execute the overlapped image mode by projecting the diffraction image by the one arranged in this position out of the plurality of emitting units.

In the image projection device according to any one of the above-described aspects, the laser oscillating unit preferably increases a light amount when the projection mode by the projection mode switching unit is the overlapped image mode than the amount in the case of the single image mode. By performing such light amount control, it is possible to prevent the viewer from receiving the impression that the screen is dark in the overlapped image mode. The same is true when switching from one diffraction image to another diffraction image.

A planetarium according to another aspect of the present invention includes a dome screen, and a first image projection device and a second image projection device for projecting an image on the dome screen, in which the second image projection device is the image projection device according to any one of the above-described aspects, and it is configured such that the image from the first image projection device and the diffraction image from the second image projection device are projected on the dome screen in an overlapped manner.

The planetarium according to the above-described aspect is further provided with a third image projection device in which the third image projection device is a device including a second laser beam source which outputs a laser beam and a second diffractive optical element provided on an optical path of the second laser beam output from the second laser beam source which generates a diffraction image by diffraction of the second laser beam and projects the diffraction image based on the second diffractive optical element on a screen, the second diffractive optical element is provided with a first diffraction grating area which generates a first diffraction image and a second diffraction grating area which generates a second diffraction image, a projection mode switching unit which performs mode switching for the projection of the diffraction image by the second diffractive optical element is included, and a projection mode switched by the projection mode switching unit includes a single image mode in which the diffraction image is projected using only one of the first diffraction grating area and the second diffraction grating area, and an overlapped image mode in which the diffraction image is projected using both the first diffraction grating area and the second diffraction grating area.

A planetarium according to still another aspect of the present invention is equipment including an image projection device and a dome screen which projects an image on the dome screen by the image projection device, in which the image projection device according to any one of the above-described aspects is used as the image projection device. As a result, it is possible to naturally switch the image while projecting the diffraction image on the dome screen as described above.

Advantageous Effects of Invention

According to this configuration, provided is an image projection device and a planetarium capable of eliminating zeroth order light and a conjugate image with a simple configuration and projecting only an originally intended direct image on a screen while using diffraction of a laser beam. Also, provided is the image projection device and the planetarium capable of not only switching the two or more different images to project but also projecting the individual images on their original projection positions even during the switching of the images.

DESCRIPTION OF EMBODIMENTS

First Embodiment

Figure 9:
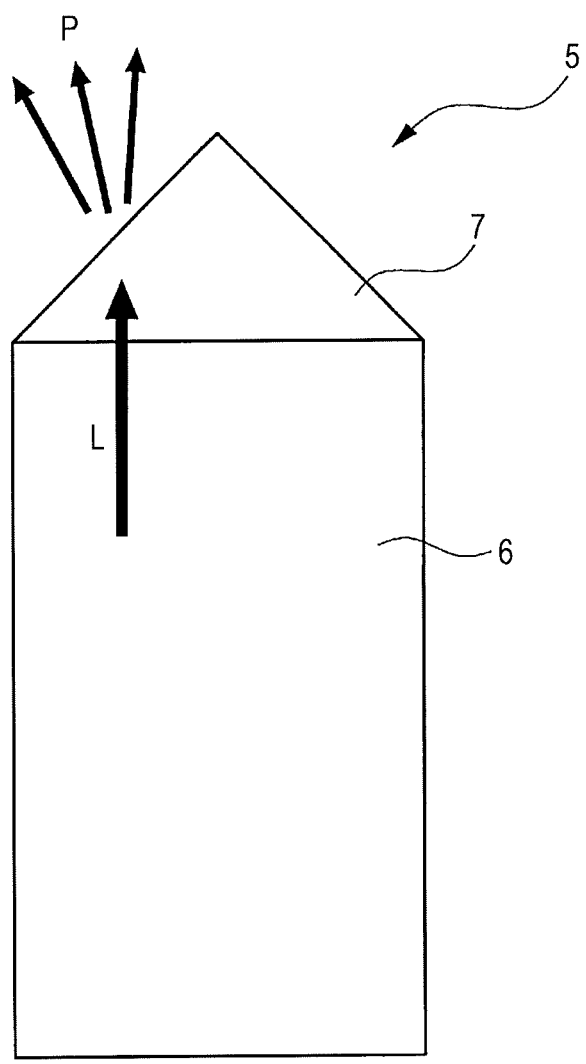
FIG. 9 is a cross-sectional view of an image projection device according to an embodiment.

Hereinafter, a first embodiment which embodies the present invention is described in detail with reference to the attached drawings. An image projection device 5 according to this embodiment is configured as illustrated in FIG. 9. The image projection device 5 in FIG. 9 includes a laser beam source 6 and a transparent member 7. In the image projection device 5, an original laser beam L emitted from the laser beam source 6 is incident on the transparent member 7. Then, a projected laser beam P is emitted from the transparent member 7. Needless to say, the transparent member 7 is made of a material transparent to the original laser beam L. Furthermore, the material of the transparent member 7 has a refractive index higher than the refractive index of a medium in a projection space ahead of this, that is, air. Naturally, the image projection device 5 is used in a state in which a certain screen is placed ahead (upward in FIG. 9) in a direction in which the projected laser beam P travels as seen from the transparent member 7. An image that is a spot group described above is projected on the screen.

Figure 1:
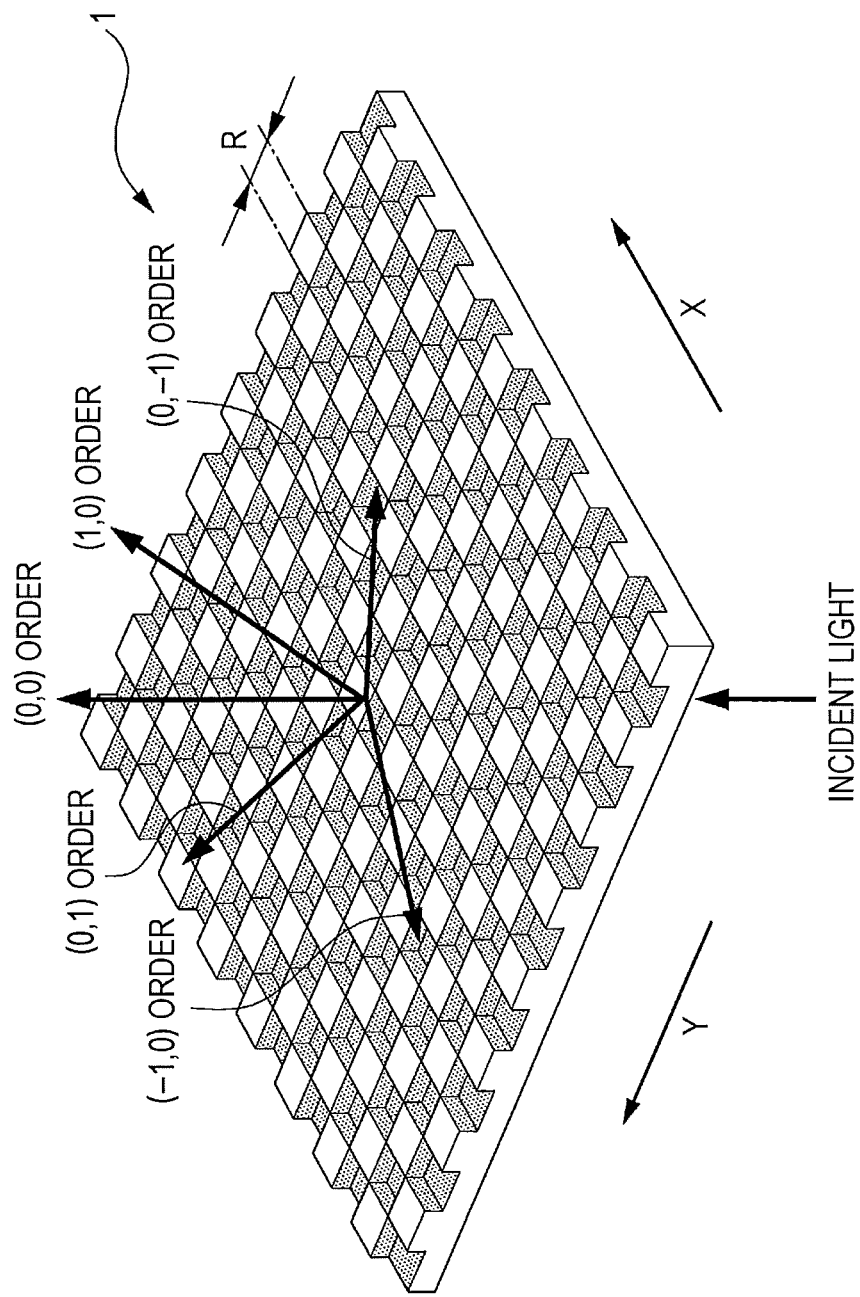
FIG. 1 is a perspective view illustrating the principle of a diffractive optical element.
Figure 5:
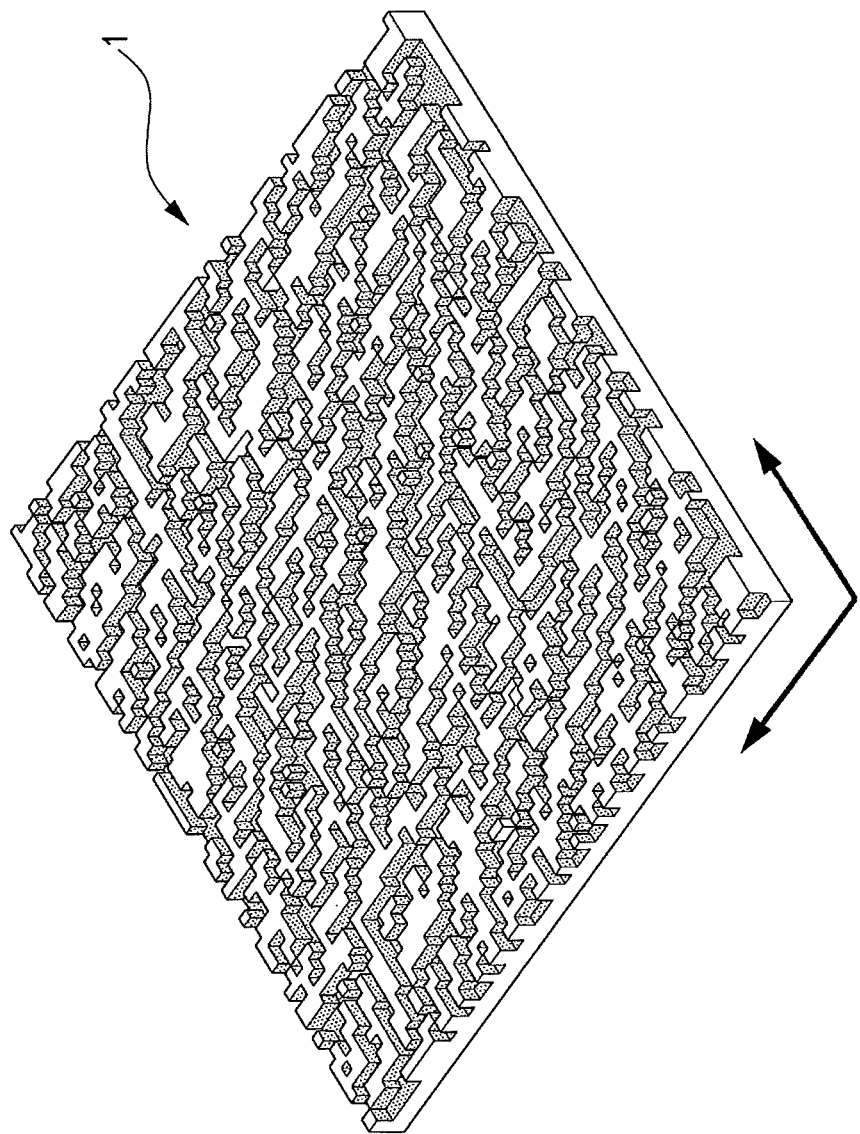
FIG. 5 is a perspective view illustrating an example of an actual diffractive optical element.
Figure 10:
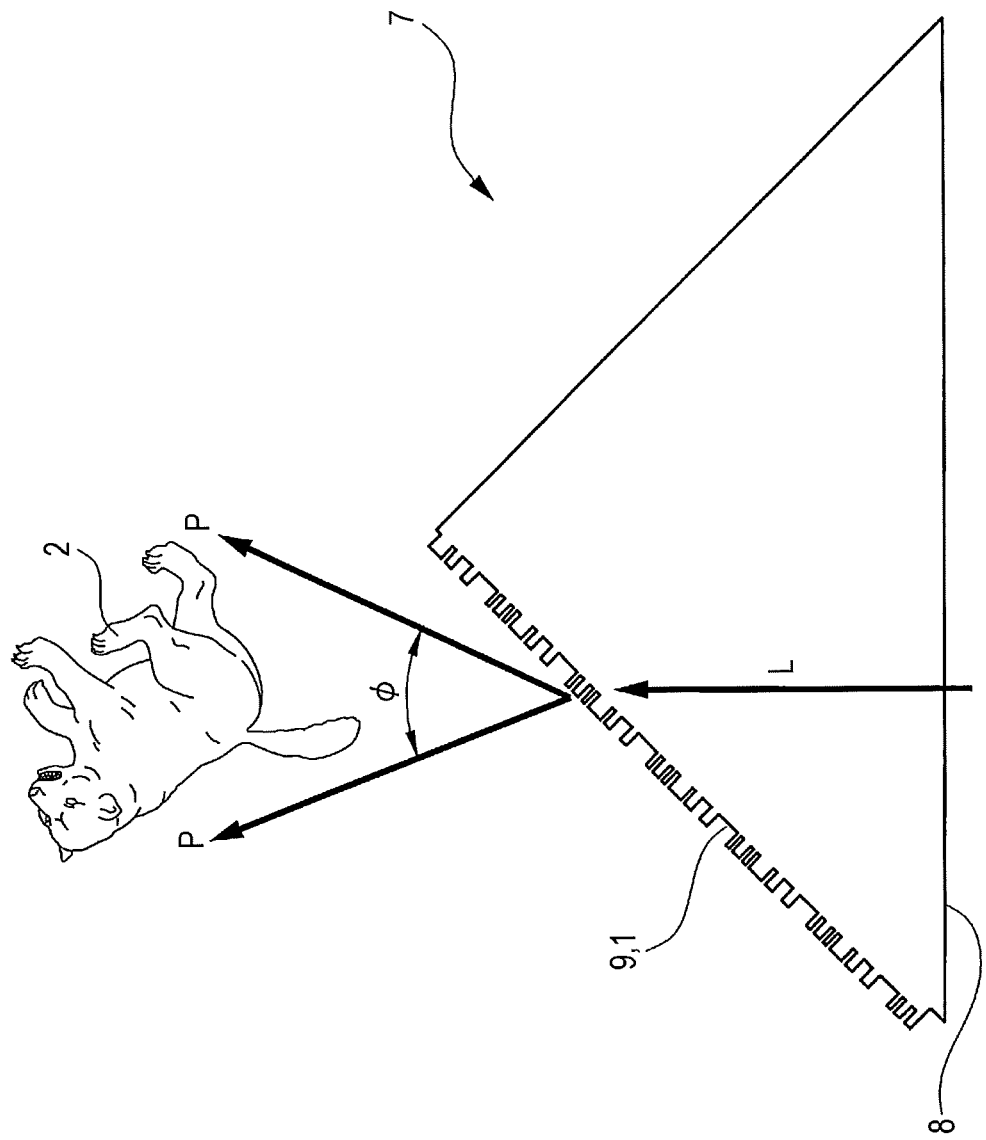
FIG. 10 is a cross-sectional view illustrating a transparent member in the projection device according to the embodiment.

The transparent member 7 is further described. As illustrated in FIG. 10, the transparent member 7 includes an incident surface 8 and an emission surface 9. Both the incident surface 8 and the emission surface 9 are flat surfaces. However, on the emission surface 9, a concavo-convex pattern described with reference to FIG. 1 and FIG. 5 is formed. That is, the emission surface 9 serves as a diffractive optical element 1. The incident surface 8 and the emission surface 9 are not parallel to each other. The original laser beam L emitted from the laser beam source 6 enters the transparent member 7 from the incident surface 8. Therefore, the original laser beam L traveling inside the transparent member 7 irradiates the diffractive optical element 1 on the emission surface 9 obliquely from the inside.

Figure 11:
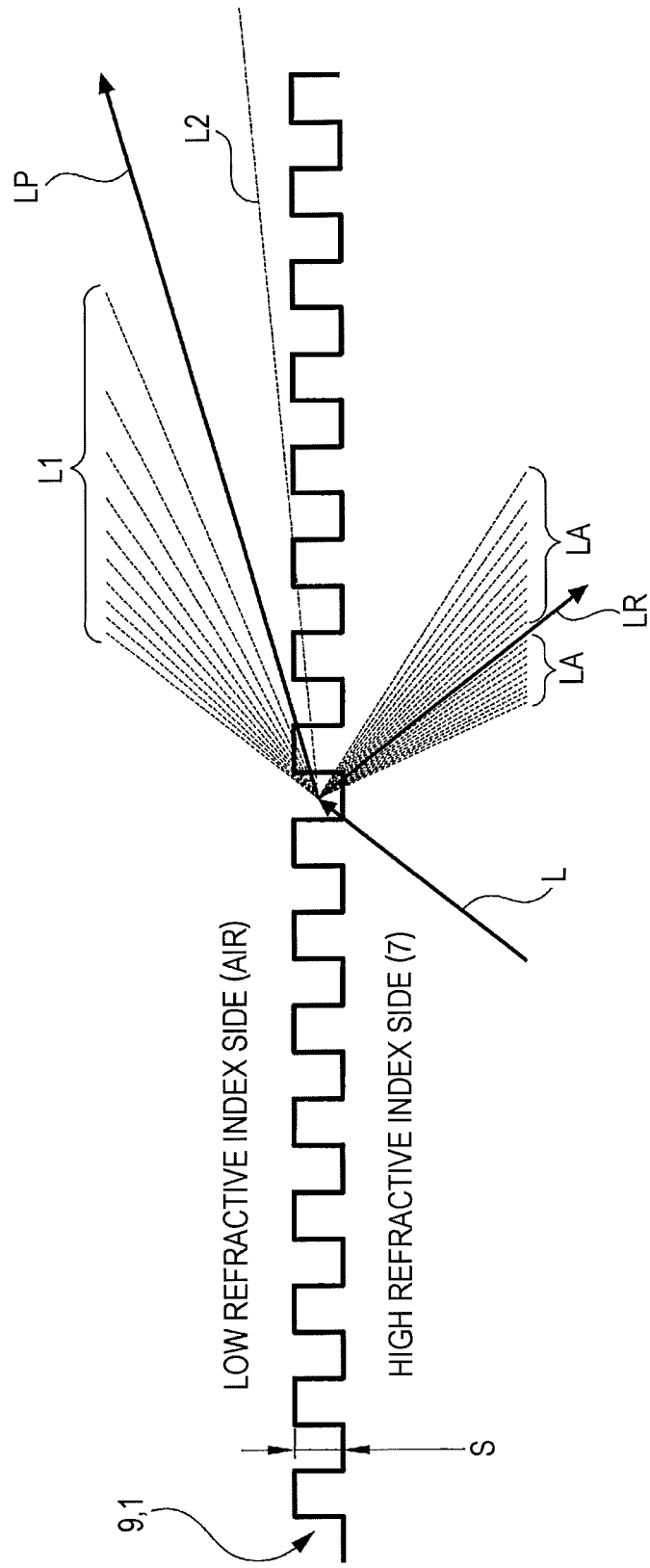
FIG. 11 is a schematic diagram (part 1) illustrating a situation of the laser beam in a site of the diffractive optical element in the embodiment.

Therefore, phenomena such as reflection, refraction, and diffraction of the laser beam occur simultaneously on the emission surface 9 (diffractive optical element 1). This is described with reference to FIGS. 11 and 12. As illustrated in FIG. 11, a reflected laser beam LR, a reflection side diffracted laser beam LA, a transmitted laser beam LP, and transmission side diffracted laser beams L1 and L2 are generated based on the original laser beam L on the emission surface 9. Among them, the reflected laser beam LR and the reflection side diffracted laser beam LA are not emitted from the emission surface 9 of the transparent member 7. The transmitted laser beam LP and the transmission side diffracted laser beams L1 and L2 are emitted from the transparent member 7. The transmitted laser beam LP corresponds to zeroth order light described above, and the transmission side diffracted laser beams L1 and L2 correspond to diffracted light forming a direct image 2 and a conjugate image 4 described above.

Herein, unlike the reflected laser beam LR traveling in a direction of regular reflection by the emission surface 9 with respect to the original laser beam L, the transmitted laser beam LP is directed in a direction refracted with respect to the direction of the original laser beam L. This is according to Snell's law based on difference in refractive index between the transparent member 7 and air. Therefore, the transmitted laser beam LP travels at a smaller angle with respect to the emission surface 9 than the original laser beam L. Along with this, the transmission side diffracted laser beam L2 out of the transmission side diffracted laser beams L1 and L2 travels only within a very narrow angle range between the transmitted laser beam LP and the emission surface 9. Therefore, in a case in FIG. 11, in an entire range of the laser beam emitted from the transparent member 7, the transmitted laser beam LP and the transmission side diffracted laser beam L2 are present in off-centered positions deviated considerably from the center thereof. Most of the entire range of the laser beam emitted from the transparent member 7 is occupied by the transmission side diffracted laser beam L1. Therefore, this transmission side diffracted laser beam L1 may be used for projecting a picture. That is, it is preferable that a projected image by the transmission side diffracted laser beam L1 is the direct image 2 described above.

Figure 12:
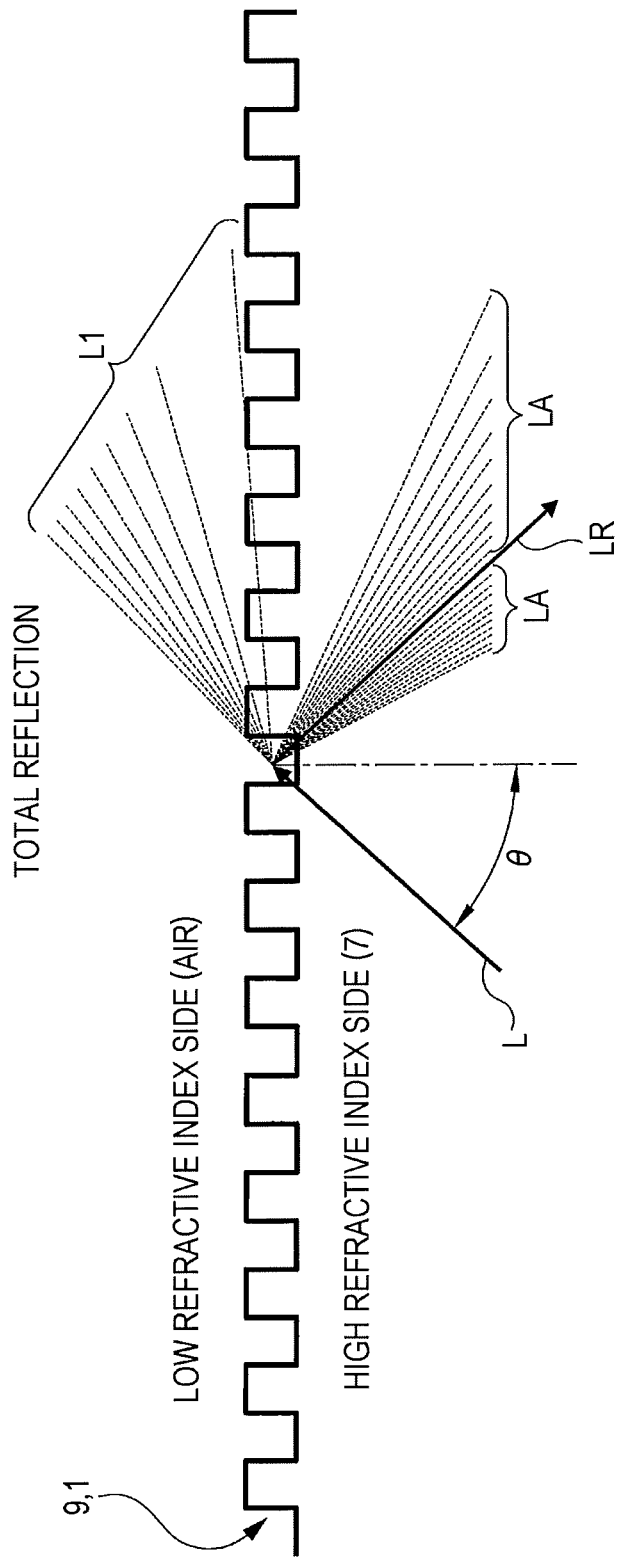
FIG. 12 is a schematic diagram (part 2) illustrating the situation of the laser beam in the site of the diffractive optical element in the embodiment.

Furthermore, FIG. 12 illustrates a case where an incident angle θ of the original laser beam L on the emission surface 9 is not smaller than a critical angle according to the Snell's law although a situation is substantially similar to FIG. 11. In this case, since it is in a total reflection state, the transmitted laser beam LP is not generated. Then, the laser beam emitted forward from the emission surface 9 is only the transmission side diffracted laser beam L1. In this case also, of course, the projected image by the transmission side diffracted laser beam L1 may be made the direct image 2. In this case, only the direct image 2 is projected on the screen.

Figure 6:
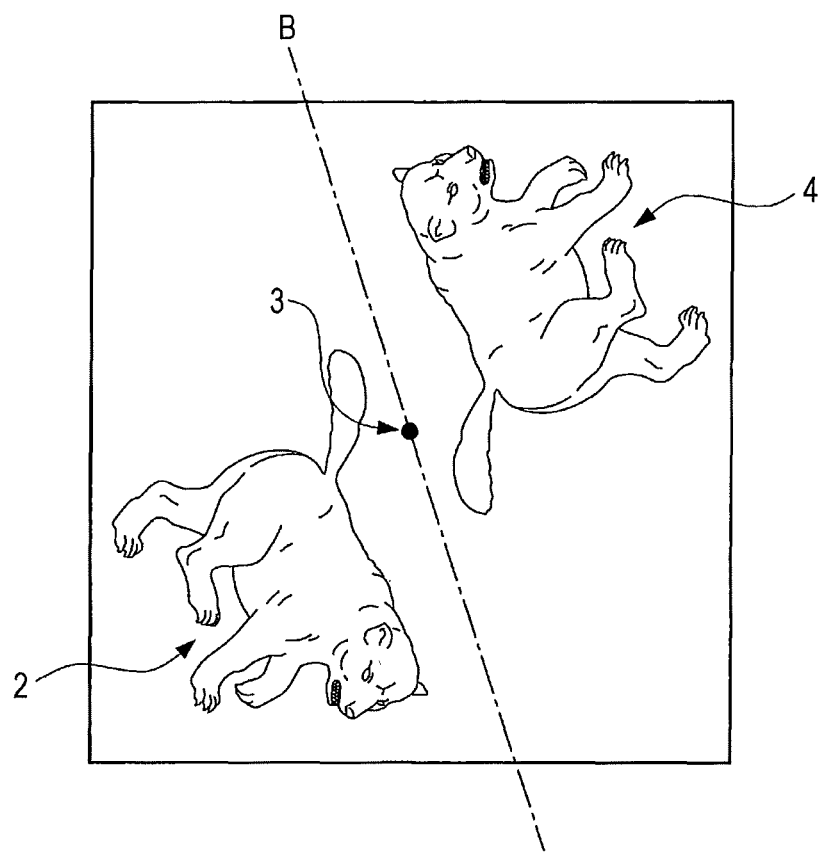
FIG. 6 is a schematic diagram (part 1) illustrating an example of a direct image, a zeroth order light image, and a conjugate image appearing in a projected image.
Figure 7:
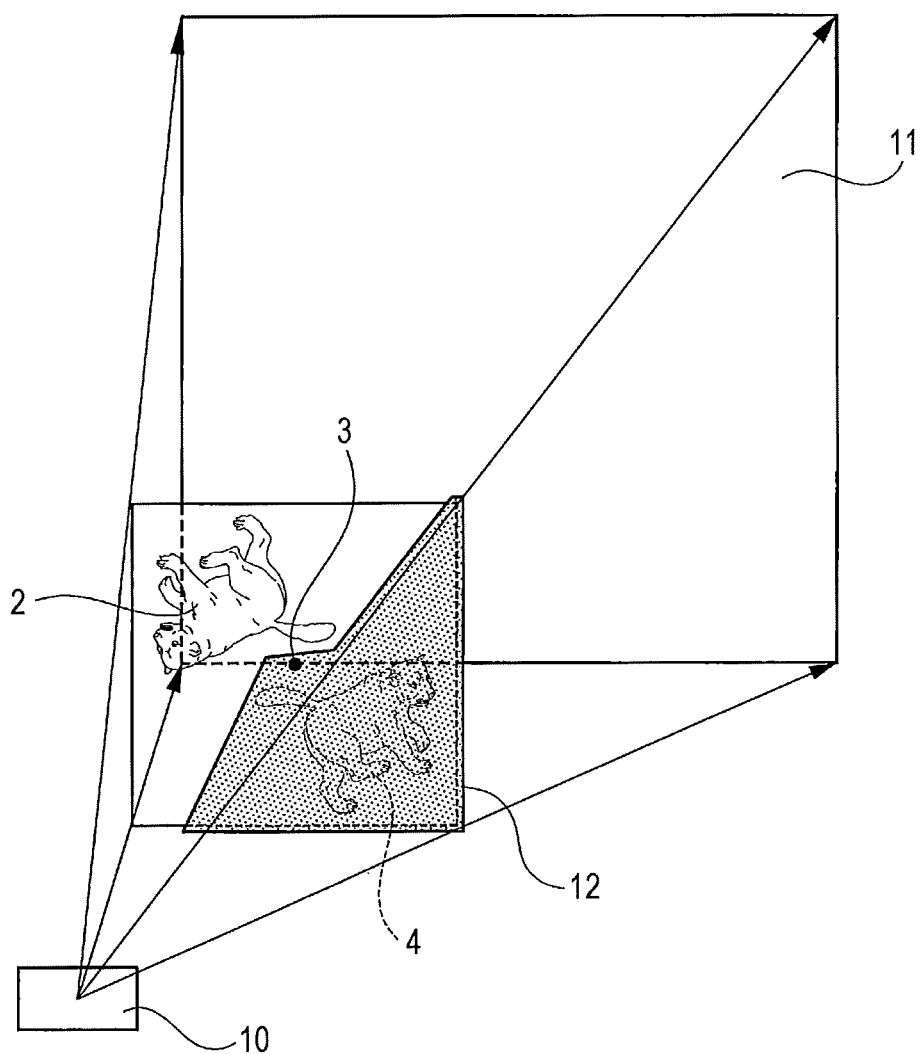
FIG. 7 is a perspective view illustrating a state in which the zeroth order light image and the conjugate image are removed by a shielding plate.
Figure 8:
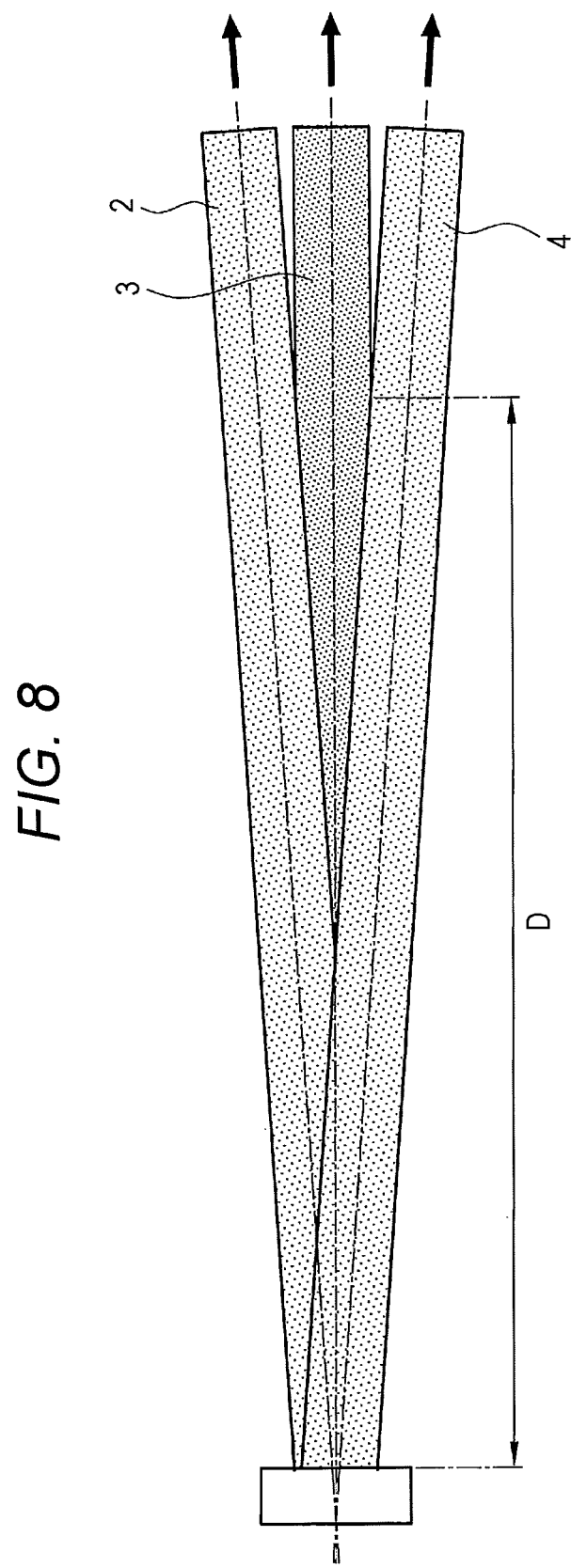
FIG. 8 is a schematic diagram illustrating optical paths of laser beams after emission.

From this, it is possible to project only the direct image 2 while eliminating the zeroth order light image 3 and the conjugate image 4 illustrated in FIG. 6 from the image projected on the screen, especially by configuring to satisfy a total reflection condition as in FIG. 12. In a case of the configuration without the total reflection condition as in FIG. 11 also, as compared with the case where the laser beam is incident perpendicularly on the diffractive optical element 1 as in the conventional technology, it is possible to easily eliminate the zeroth order light image 3 and the conjugate image 4. This is because the transmitted laser beam LP (zeroth order light) and the transmission side diffracted laser beam L2 (conjugate diffracted light) appear in off-centered positions deviating from the center in an entire projected figure as illustrated in FIG. 11. Therefore, it is possible to easily arrange the image projection device 5 with respect to the screen such that the zeroth order light image 3 and the conjugate image 4 are out of a range of the screen. Even in a case of eliminating the zeroth order light image 3 and the conjugate image 4 by a shielding plate, it is much easier than the case of the conventional technology illustrated in FIG. 8.

However, in order to realize the above, there is certain restriction on the projected image by the diffractive optical element 1. This is hereinafter described. At the minimum, in the diffractive optical element 1 for realizing the above, the direct image 2 needs to be completely separated from the zeroth order light image 3 and the conjugate image 4 in terms of arrangement of the projected image in a case of perpendicular incidence. FIG. 6 illustrates an example in which this condition is satisfied. That is, in the example in FIG. 6, a straight line B may be drawn between the direct image 2 and the conjugate image 4. The straight line B passes through the zeroth order light image 3 and does not intersect with the direct image 2 or the conjugate image 4. With respect to the straight line B, the direct image 2 is present only within a range on one side, and the conjugate image 4 is present only within a range on the opposite side. In such a case, it is possible that all the light of the spot group of the direct image 2 is included within the range of the transmission side diffracted laser beam L1 in FIG. 11 while the zeroth order light and the light of the conjugate image 4 are not at all included therein.

Figure 13:
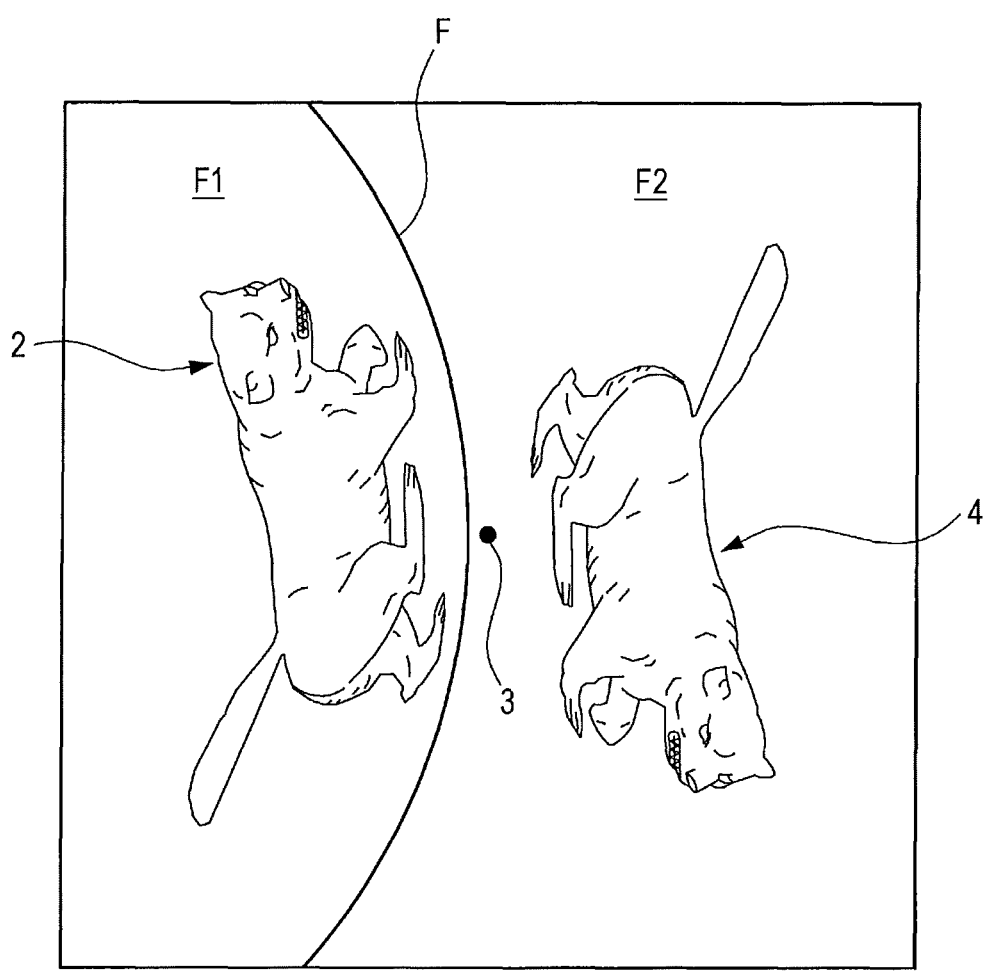
FIG. 13 is a schematic diagram illustrating a condition to be satisfied by appearance of the direct image, the zeroth order light image, and the conjugate image in a case of a total reflection condition.
Figure 14:
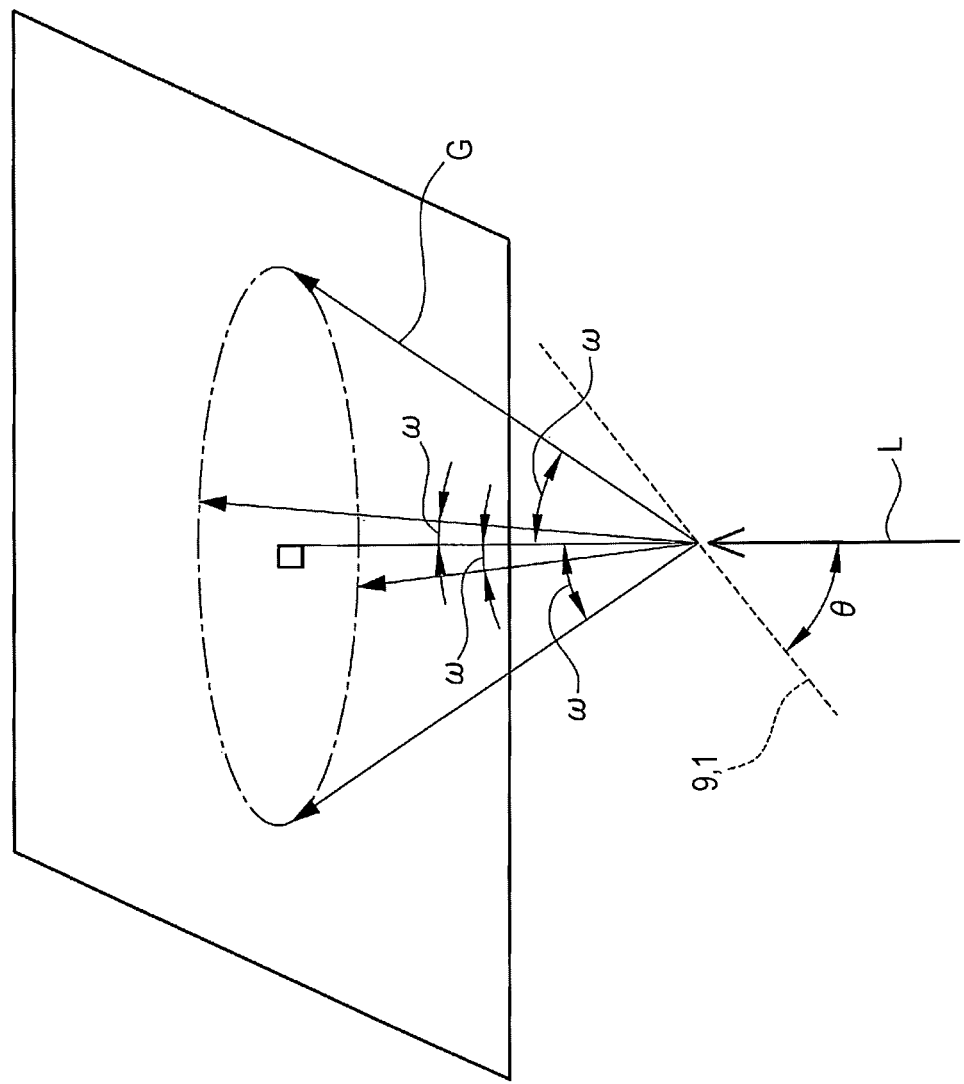
FIG. 14 is a perspective schematic diagram illustrating an angular range of light that may be emitted from the transparent member in the case of the total reflection condition.

Furthermore, in order to perform projection in a state in which the total reflection condition illustrated in FIG. 12 is satisfied, in addition to the above-described complete separation condition, the condition illustrated in FIG. 13 also needs to be satisfied. FIG. 13 is a view similar to FIG. 6 but with a total reflection critical curve F drawn in place of the straight line B. The total reflection critical curve F is a boundary between a range in which emission from the transparent member 7 is possible even in a case where the total reflection condition is satisfied and a range in which the emission is not possible in a projection area in the case of the perpendicular incidence as illustrated in FIG. 6. That is, in a case where the total reflection condition is satisfied, as illustrated in FIG. 14, a conical surface G formed by a light ray inclined by a critical angle ω of total reflection (smaller than the incident angle θ) with respect to the original laser beam L may be considered. Light may be emitted from the transparent member 7 only within the range inside this conical surface G and the light cannot be emitted from the transparent member 7 outside the conical surface G. For details on this point, for example, please refer to [0009] and [0010] of JP 2004-031856 A.

The total reflection critical curve F illustrated in FIG. 13 is a curve corresponding to a boundary line between an area F1 inside the conical surface G and an area F2 outside thereof in FIG. 14. The area F1 in which the light may be emitted is slightly narrower than the area obtained by dividing into two by the straight line B illustrated in FIG. 6. It is necessary that the direct image 2 is completely included in this area F1 and the conjugate image 4 is completely included in the area F2. Meanwhile, a position of the zeroth order light image 3 is necessarily out of the area F1 when the total reflection condition is satisfied. Meanwhile, in FIG. 13, the pictures of the direct image 2 and the conjugate image 4 are slightly distorted with respect to the pictures illustrated in FIG. 6; this is because this drawing illustrates the pictures subjected to inverse distortion to be described later.

Figure 15:
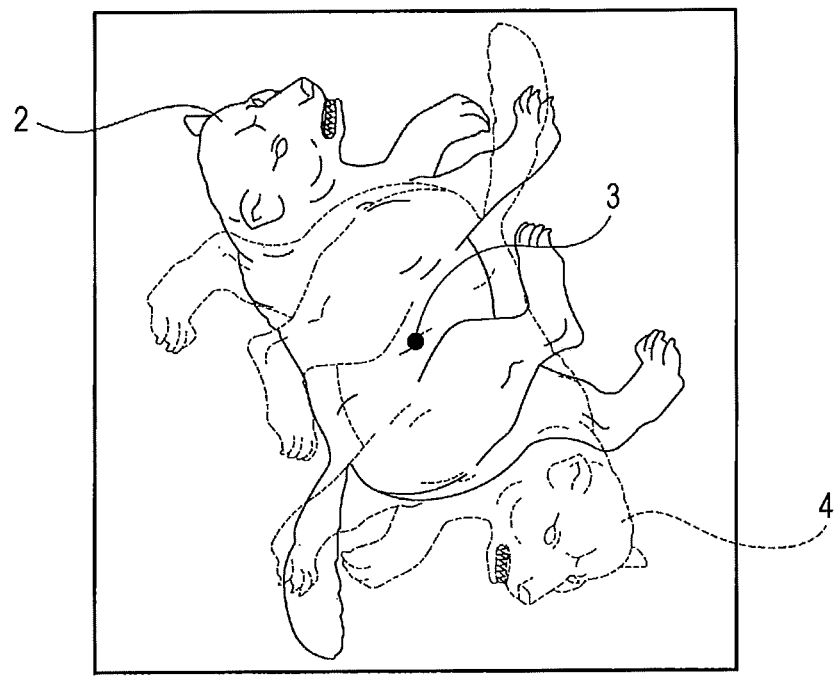
FIG. 15 is a schematic diagram (part 2) illustrating an example of the direct image, the zeroth order light image, and the conjugate image appearing in the projected image.

As an example that cannot satisfy the above-described condition, for example, there is one illustrated in FIG. 15. In the example in FIG. 15, the direct image 2 is generated so as to enclose the zeroth order light image 3 in terms of the arrangement of the projected image in the case of the perpendicular incidence. As a result, the direct image 2 and the conjugate image 4 inevitably overlap with each other. In the example in FIG. 15, a straight line corresponding to the straight line B in FIG. 6 cannot be drawn. This is because, even with any straight line passing through the zeroth order light image 3, both the direct image 2 and the conjugate image 4 are present on both sides across the straight line. Even if the diffractive optical element which generates such diffraction image with the perpendicular incidence is incorporated in the image projection device 5, it is not possible to include all the light of the direct image 2 within the range of the transmission side diffracted laser beam L1 described above, and on the contrary, a part of the light of the conjugate image 4 surely enters. As a result, on the screen, an image obtained by folding an original image in half to overlap is projected.

Whether the image at the time of the perpendicular incidence by the diffractive optical element satisfies the above-described complete separation condition may also be determined as follows. That is, it suffices if both of the conditions (1) and (2) below are satisfied.

(1) The direct image 2 is not overlapped with the zeroth order light image 3.

(2) The area of the direct image 2 and the area of the conjugate image 4 are not overlapped with each other.

Figure 16:
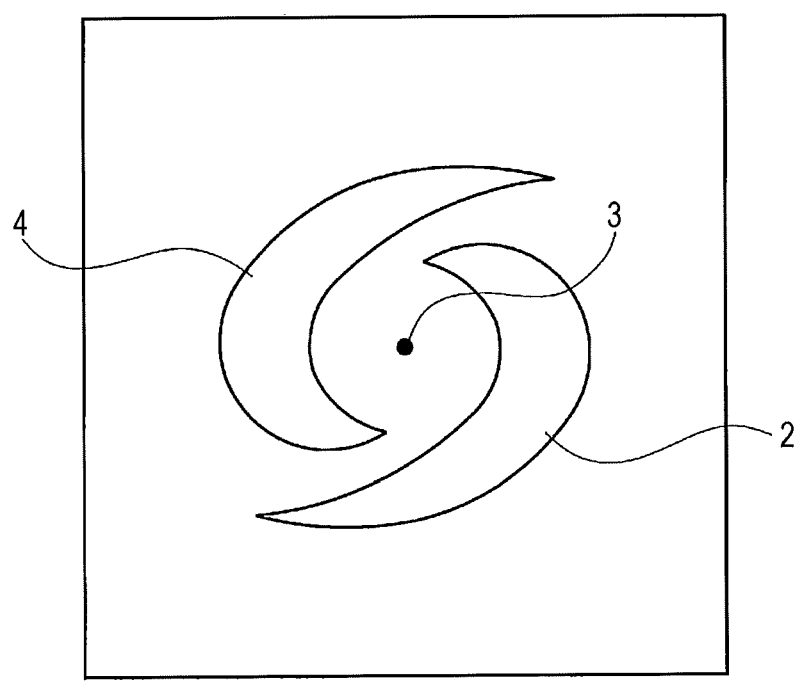
FIG. 16 is a schematic diagram (part 3) illustrating an example of the direct image, the zeroth order light image, and the conjugate image appearing in the projected image.
Figure 17:
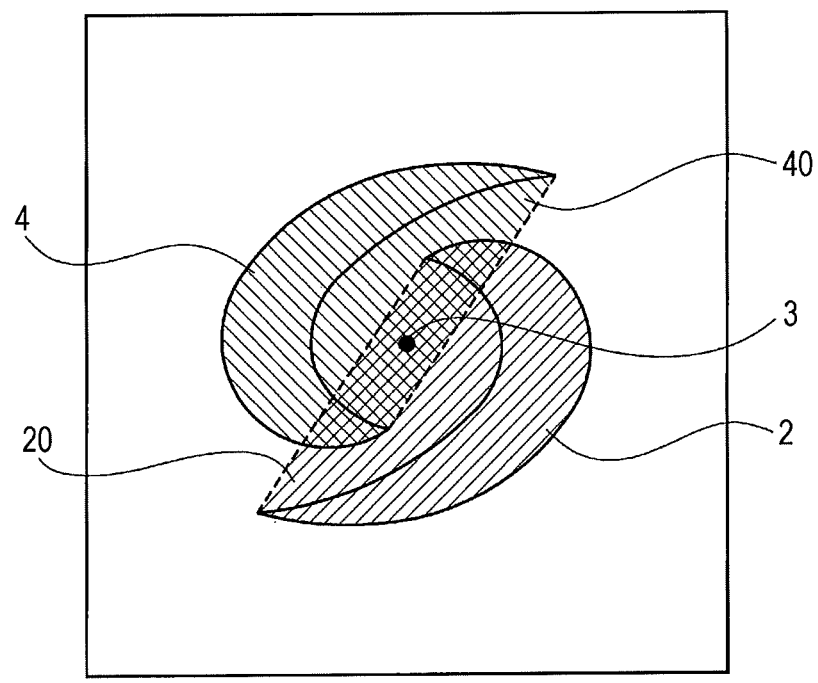
FIG. 17 is a schematic diagram illustrating areas of the direct image and the conjugate image in the projected image in FIG. 16.

Herein, the "area" of the direct image 2 is a largest polygon formed by points forming the direct image 2. The same applies to the area of the conjugate image 4. For example, it is assumed that the image at the time of the perpendicular incidence is as illustrated in FIG. 16. In this case, it seems that the direct image 2 does not overlap with the zeroth order light image 3 or the conjugate image 4 at first glance. However, in FIG. 16, neither the straight line corresponding to the straight line B in FIG. 6 nor the total reflection critical curve F illustrated in FIG. 13 may be drawn. Considering up to the "area", as illustrated in FIG. 17, an area 20 of the direct image 2 and an area 40 of the conjugate image 4 overlap with each other, so that (2) is not satisfied setting (1) aside. The diffractive optical element 1 that generates such images with the perpendicular incidence is not appropriate as that of this embodiment.

Meanwhile, a separation relationship among the direct image 2, the zeroth order light image 3, and the conjugate image 4 described above is not limited to the case of the perpendicular incidence, and basically the same applies also in a case of inclined incidence. Even in the case of the inclined incidence, in a situation in which all of the direct image 2, the zeroth order light image 3, and the conjugate image 4 appear (situation in FIG. 11), they are still separated.

In order to include all the spot groups of the direct image 2 within the range of the transmission side diffracted laser beam L1 in FIG. 11 or FIG. 12 and to exclude the conjugate image 4 completely, the following condition is required in addition to the fact that the diffractive optical element 1 forms a diffraction image satisfying the above-described separation relationship (furthermore, in the case of the total reflection condition, also the condition in FIG. 13). That is, it is necessary for the above-described diffractive optical element 1 to be arranged on the emission surface 9 being an inclined surface in a predetermined direction with respect to a maximum inclination direction thereof.

In short, it is required that the straight line B in FIG. 6 is in a relationship parallel to a horizontal line on the emission surface 9. In the case of FIG. 13, it is necessary that the straight line perpendicular to the total reflection critical curve F and passing through the position of the zeroth order light image 3 is perpendicular to the horizontal line on the emission surface 9. With this arrangement, the position occupied by the direct image 2 in the case of the perpendicular incidence is located on a side lower than the position of the zeroth order light in the case of the perpendicular incidence with respect to the maximum inclination direction on the emission surface 9. Then, due to the inclined incidence, only the direct image 2 is included within the range of the transmission side diffracted laser beam L1 and a target image projection is performed. As described above, in this embodiment, from the irradiation light on the screen, the zeroth order light and the diffracted light forming the conjugate image 4 are substantially eliminated in accordance with the above-described separation relationship (furthermore, the condition in FIG. 13 in the case of the total reflection condition) and a direction relationship. Then, only the diffracted light forming the diffraction image which is the direct image 2 is applied.

If the diffractive optical element 1 is arranged in a direction rotated by 90° in a plane with respect to the above, the image appears on the projected image in a partially separated manner. In the example in FIG. 6, an image in which a part of a tail disappears and an image only of the disappeared tail appear separately. Meanwhile, the horizontal line on the emission surface 9 is a line in a direction perpendicular to the plane of the drawing in FIGS. 11 and 12. In addition, the maximum inclination direction of the emission surface 9 is a lateral direction in FIGS. 11 and 12 in which a left side corresponds to the lower side and a right side corresponds to the higher side.

Meanwhile, in the image projection device 5 of this embodiment, the image (spot group) projected on the screen is not the same as the image in the case of the perpendicular incidence but is slightly distorted. This is because the original laser beam L is obliquely incident on the diffractive optical element 1 as illustrated in FIG. 10. Therefore, the diffractive optical element 1 used in the image projection device 5 of this embodiment is desirably designed based on an image obtained by applying the inverse distortion to the original image in view of the above.

Figure 2:
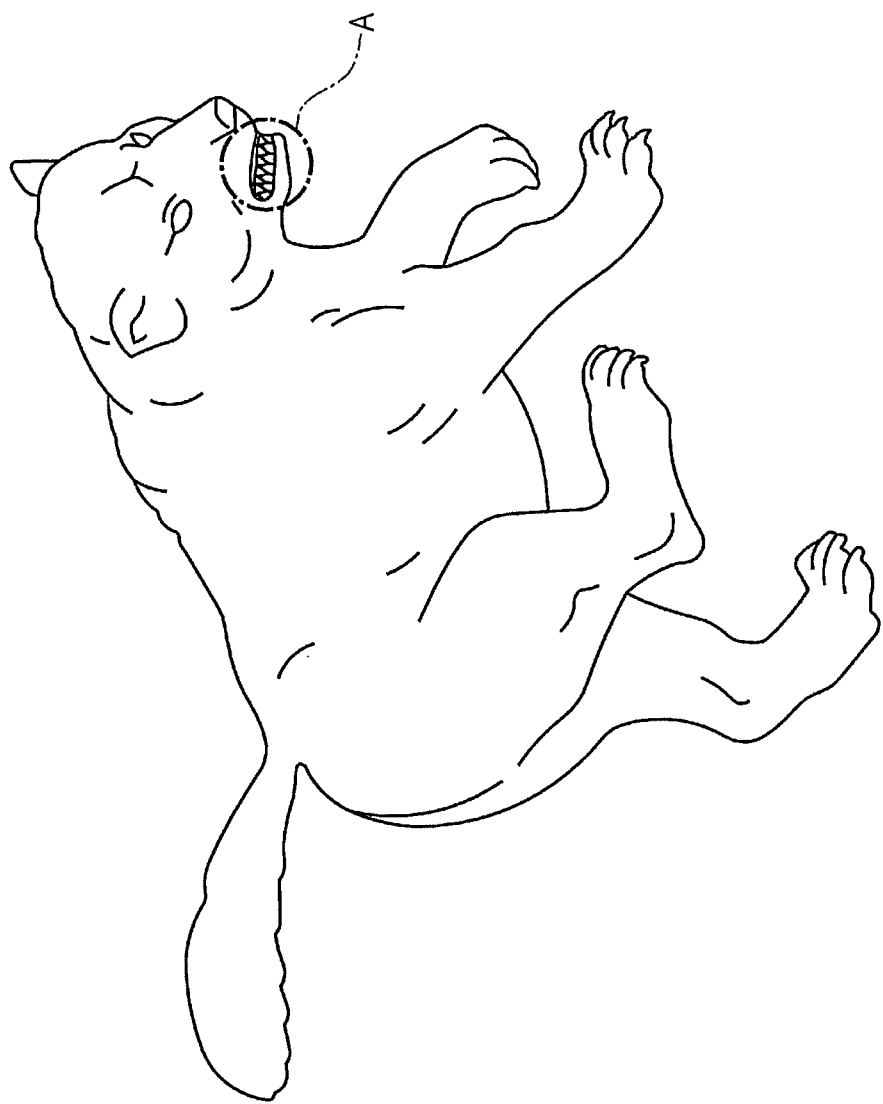
FIG. 2 is a front view illustrating an example of a picture projected by the diffractive optical element.
Figure 3:
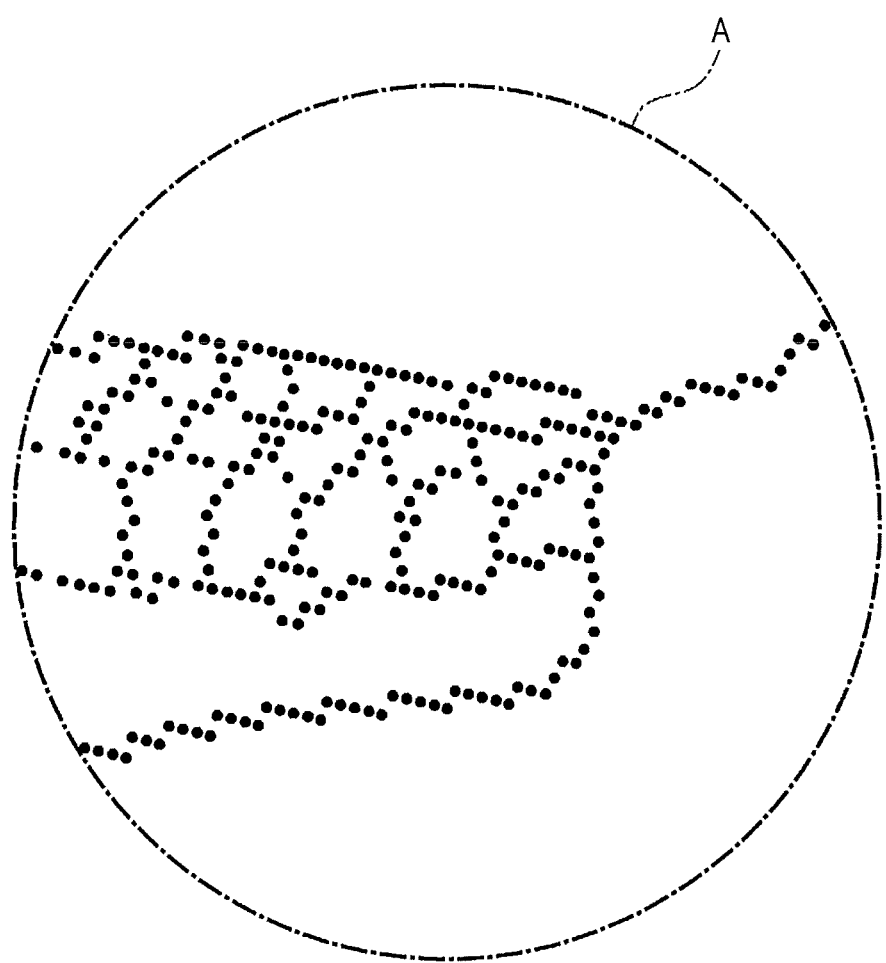
FIG. 3 is an enlarged view of a part of FIG. 2.
Figure 18:
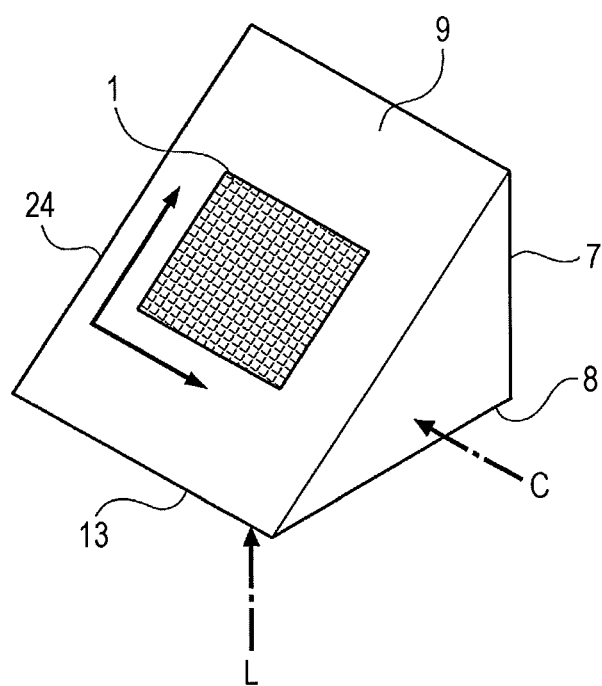
FIG. 18 is a perspective view (part 1) illustrating an arrangement example of the diffractive optical element on an emission surface of the transparent member.
Figure 19:
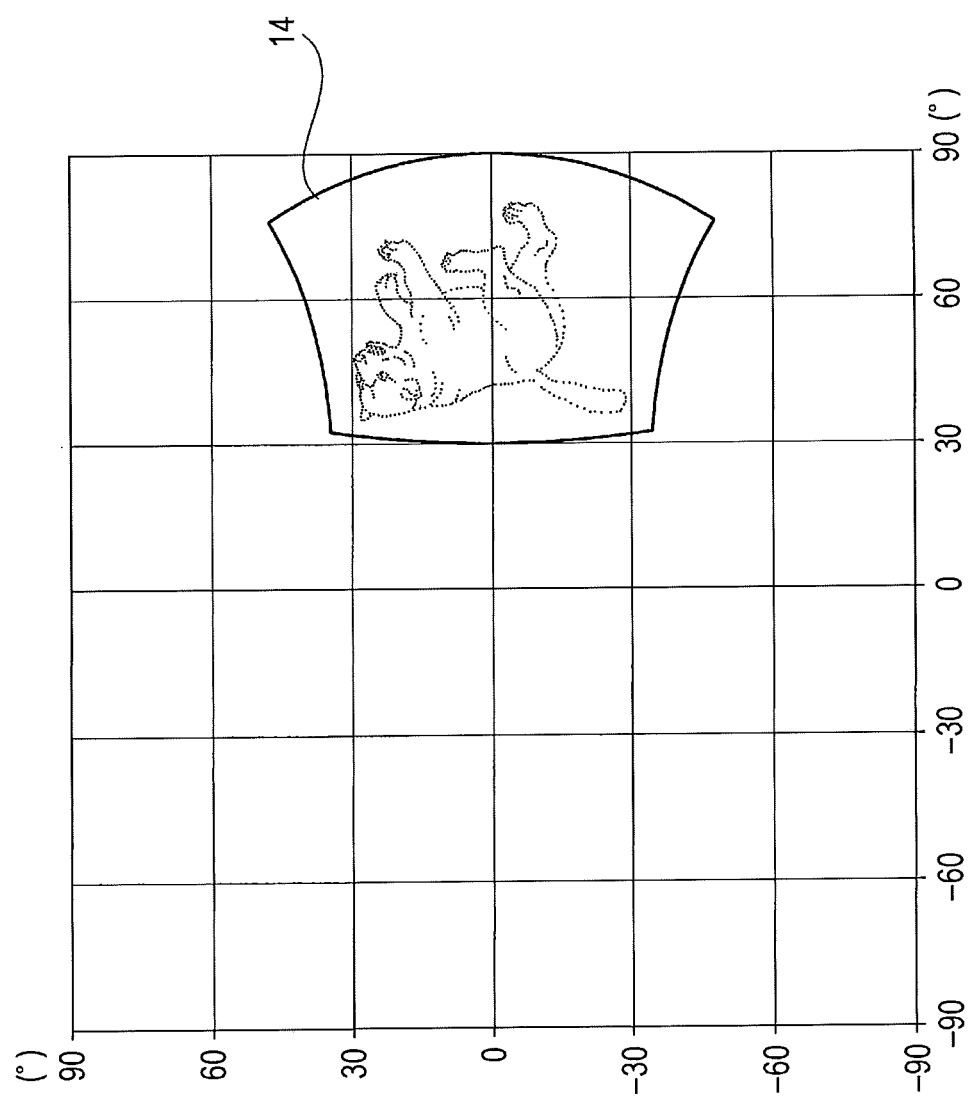
FIG. 19 is a schematic diagram (part 1) illustrating image distortion due to oblique incidence.
Figure 20:
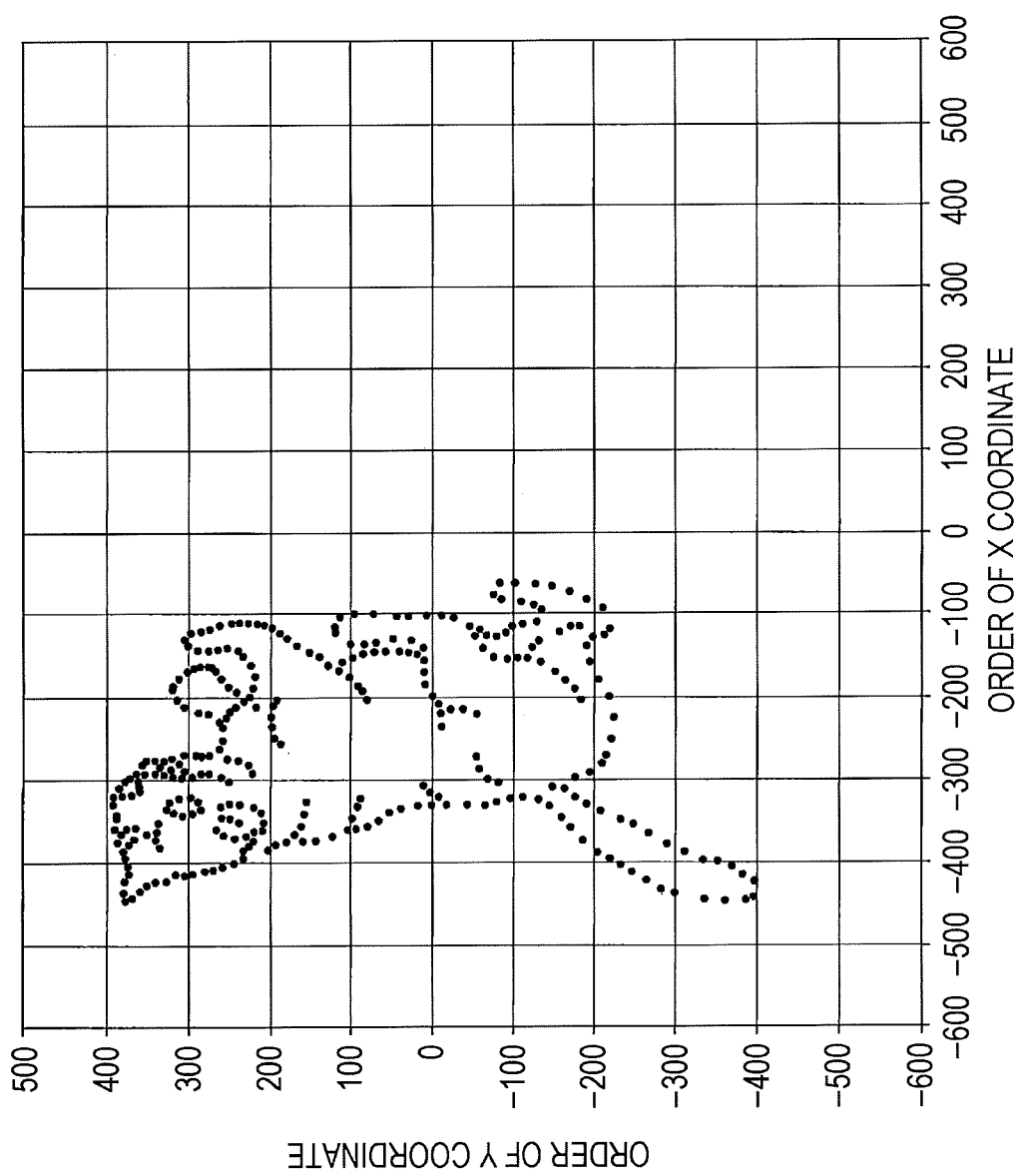
FIG. 20 is a schematic diagram illustrating an example of an image obtained by applying inverse distortion to an original image.

For example, as illustrated in FIG. 18, a case where axes of a grating of the diffractive optical element 1 are parallel and perpendicular to a bottom side 13 of the emission surface 9 is considered. Furthermore, in the case of the projection by the perpendicular incidence, the diffractive optical element 1 is assumed to generate the direct image 2 within a rectangular area with a field angle (spread angle of projected laser beam P such as an angle φ in FIG. 10) of 50°×60°. In this case, when the image projection device 5 projects, the diffracted light of the spot group forming the direct image 2 is present somewhere in an area indicated by a bold line 14 in FIG. 19 in a hemispherical space with a radius of 90°. This area has a somewhat distorted shape as illustrated. Naturally, an actual picture appearing in this becomes distorted accordingly. Therefore, the diffractive optical element 1 which forms the image obtained by applying the inverse distortion to the original image by the perpendicular incidence as illustrated in FIG. 20 is used. With this, in the configuration example illustrated in FIG. 18, it is possible to project an image sticking to the original image (herein, the picture as illustrated in FIG. 2) in the bold line 14 in FIG. 19. Meanwhile, the inversely distorted picture is also illustrated in FIG. 13 described above.

Figure 4:
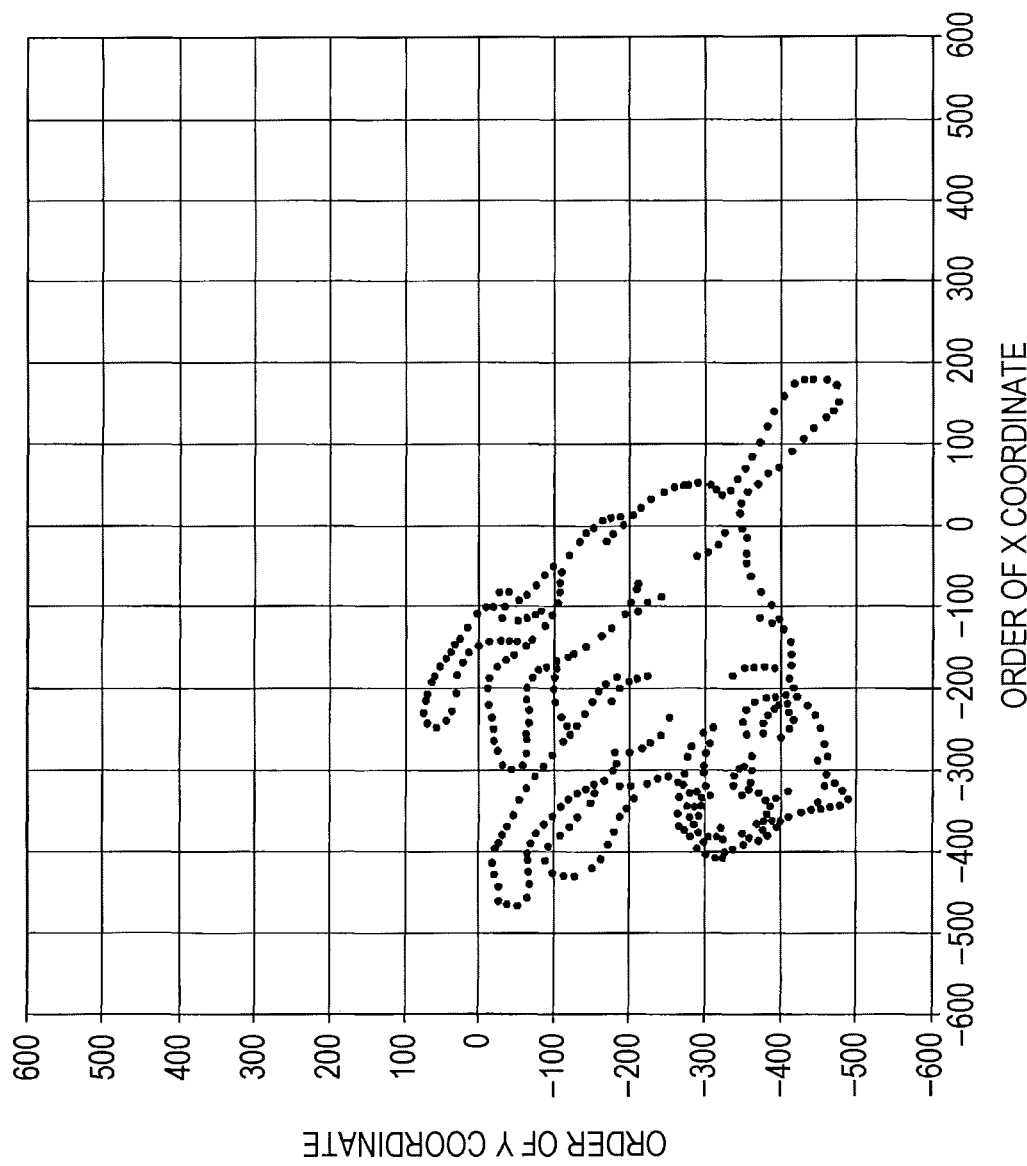
FIG. 4 is a schematic diagram illustrating a relationship between the projected picture and coordinate points.
Figure 21:
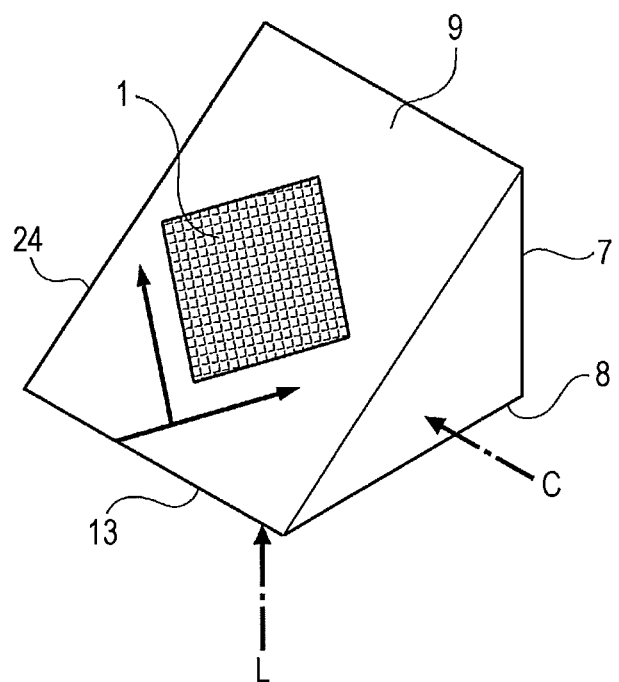
FIG. 21 is a perspective view (part 2) illustrating the arrangement example of the diffractive optical element on the emission surface of the transparent member.
Figure 22:
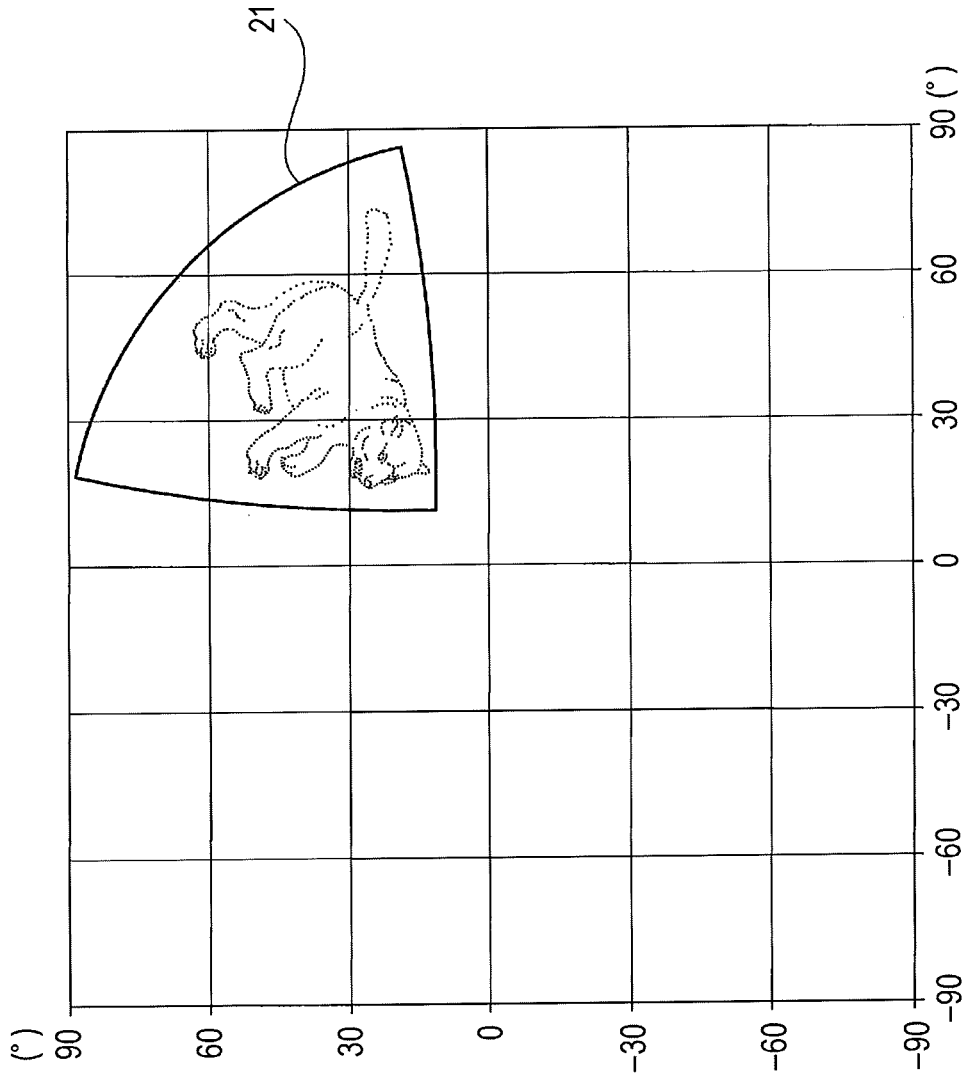
FIG. 22 is a schematic diagram (part 2) illustrating the image distortion due to the oblique incidence.

Also, as illustrated in FIG. 21, arrangement in which the axes of the grating of the diffractive optical element 1 are oblique with respect to the bottom side 13 of the emission surface 9 is also possible. In this case also, there is image distortion, but the distortion is different from the above. In this case, the diffracted light of the spot group forming the direct image 2 is present somewhere in an area indicated by a bold line 21 in FIG. 22 in the hemispherical space. Therefore, in this case, the diffractive optical element 1 which forms an inversely distorted image different from that illustrated in FIG. 20 by the perpendicular incidence is used. In fact, the one illustrated in FIG. 4 is the inversely distorted image in this case. Meanwhile, FIGS. 11 and 12 above correspond to cross-sectional views of the diffractive optical element 1 in FIGS. 18 and 21 as seen in a direction of an arrow C. Also, a horizontal direction of the emission surface 9 described above is a direction parallel to the bottom side 13 in FIGS. 18 and 21. The maximum inclination direction of the emission surface 9 is a direction parallel to an oblique side 24.

First Example

Figure 23:
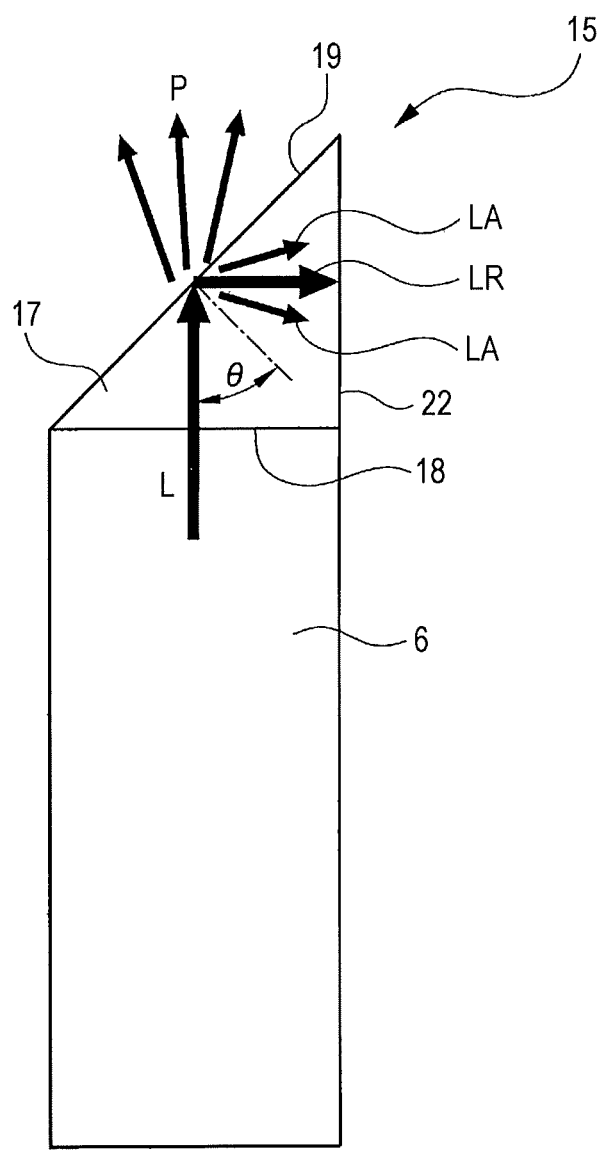
FIG. 23 is a cross-sectional view illustrating a configuration example (first example) of the image forming device.

An image projection device 15 in FIG. 23 is described as a first example. In the image projection device 15 in FIG. 23, a triangle pole prism is used as a transparent member 17. Herein, the triangle pole prism having a cross-section in an isosceles right triangle is used in which one of short side surfaces serves as an incident surface 18 and a long side surface serves as an emission surface 19. A material of the transparent member 17 is quartz glass (with refractive index of 1.457). In this case, the critical angle of the total reflection upon emission to the air is 43.34°. Therefore, by allowing the original laser beam L to be perpendicularly incident on the incident surface 18 from the laser beam source 6, the incident angle θ on the emission surface 19 is 45° which is not smaller than the critical angle. Therefore, the projection is performed under the total reflection condition illustrated in FIG. 12.

As the diffractive optical element 1, quartz glass was used as in the transparent member 17, and a concavo-convex pattern was formed on a substrate thereof by using a micro electro mechanical systems (MEMS) technology. The number of stages of the concavo-convex pattern is two including "convex" and "concave" which is the simplest. The diffractive optical element 1 was adhered to the emission surface 19 of the transparent member 17 with an optical adhesive.

In the first example, a wavelength of the original laser beam L from the laser beam source 6 was set to 635 nm (red). Also, a pixel size (R in FIG. 1) of the diffractive optical element 1 was set to 600 nm. By this, the original image may be represented by a diffraction order within ±512 orders horizontally and vertically within the above-described area of the field angle of 50°×60°. As a result, within the hemispherical space with the radius of 90°, within the bold line area 14 in FIG. 19 (in a case where the diffractive optical element 1 is arranged as in FIG. 18), or within the bold line area 21 in FIG. 22 (in a case where the diffractive optical element 1 is arranged as in FIG. 21), the projected image to reproduce the original image is stored. Meanwhile, a stage (S in FIG. 11) of the concavo-convex pattern of the diffractive optical element 1 was set to approximately 700 nm.

In the case of the arrangement of the transparent member 17 illustrated in FIG. 23, the reflected laser beam LR obtained by reflection (total reflection) of the original laser beam L on the emission surface 19 is perpendicularly incident on a third surface 22 of the transparent member 17. Most of the reflection side diffracted laser beam LA is also incident on the third surface 22. Therefore, in this arrangement, for example, by providing an appropriate light absorbing member on the third surface 22, it is possible to absorb a reflected component of the laser beam. As a result, generation of an unnecessary light ray may be prevented.

Second Example

Figure 24:
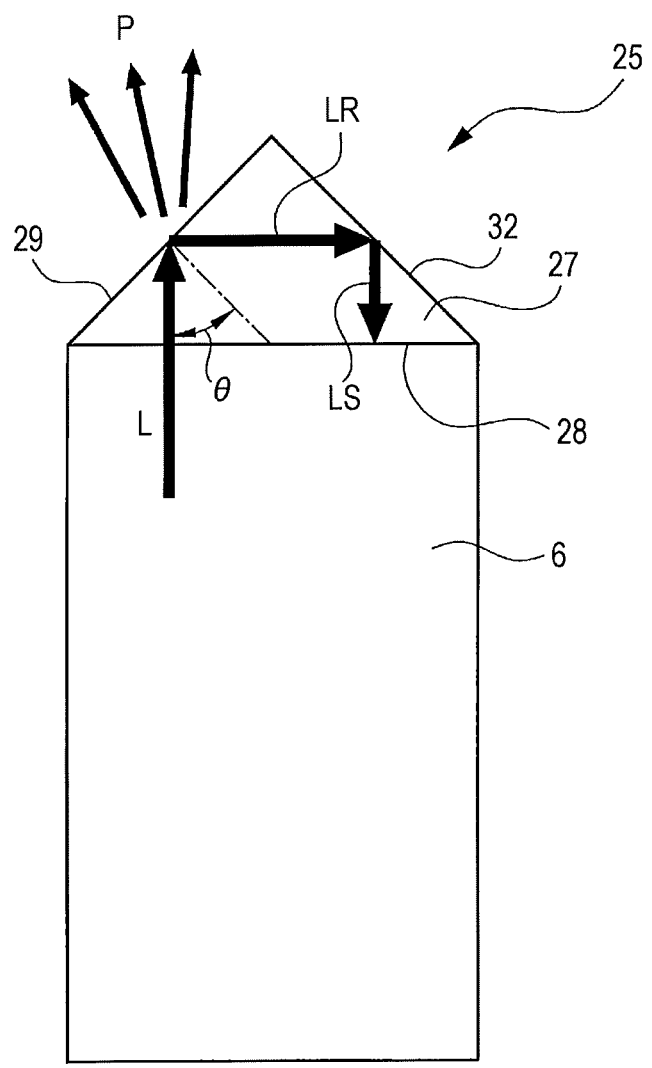
FIG. 24 is a cross-sectional view illustrating a configuration example (second example) of the image forming device.

An image projection device 25 in FIG. 24 is described as a second example. A transparent member 27 in the image projection device 25 in FIG. 24 is the same as the transparent member 17 in the above-described first example in that this is a triangle pole prism having a cross-section in an isosceles right triangle. However, the arrangement thereof is different; a long side surface serves as an incident surface 28 and one of short side surfaces serves as an emission surface 29 in the second example. Other points are the same as those in the first example. The configuration illustrated in FIG. 9 is similar to this. Of course, even with the configuration of the second example, it is possible to project an image that reproduces the original image under the total reflection condition as in the case of the first example.

In a case of the arrangement of the transparent member 27 illustrated in FIG. 24, the reflected laser beam LR obtained by reflection (total reflection) of the original laser beam L on the emission surface 29 satisfies the total reflection condition also on a third surface 32 of the transparent member 27. As a result, a secondary reflected laser beam LS returns toward the laser beam source 6. Therefore, by partially providing an appropriate light absorbing member between the laser beam source 6 and the incident surface 28 so as not to disturb the original laser beam L, it is possible to absorb a return component of the laser beam. Also, by providing an appropriate light absorbing member also on the third surface 32, it is possible to prevent the diffracted laser beam based on the reflected laser beam LR from emitting from the third surface 32.

Figure 25:
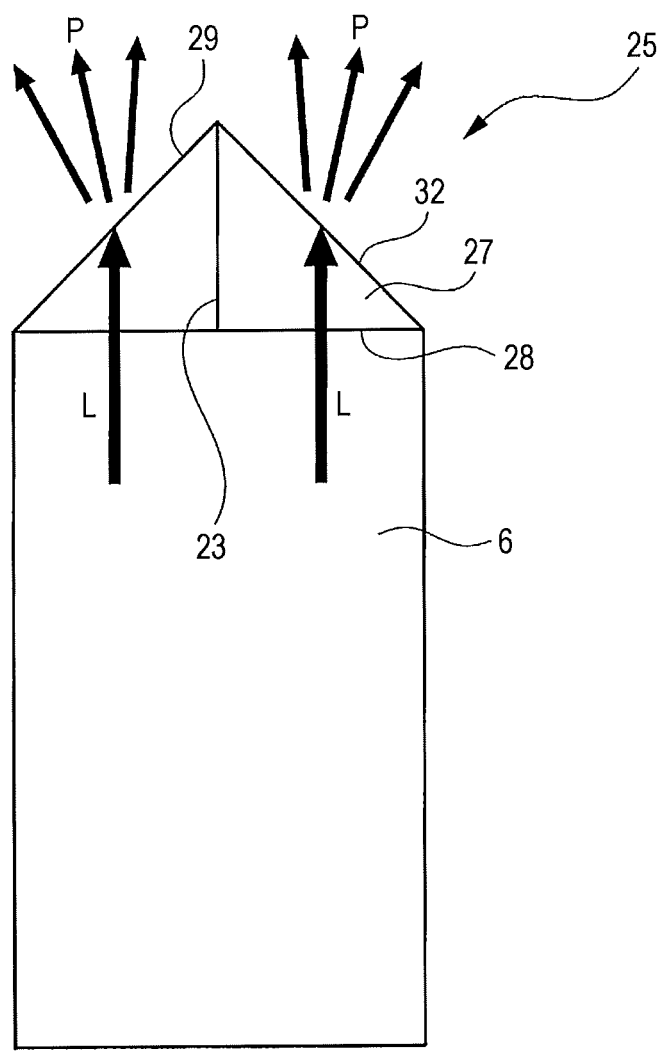
FIG. 25 is a cross-sectional view illustrating a variation of the second example.

Alternatively, in the configuration of the second example, as illustrated in FIG. 25, a variation in which two original laser beams L are emitted from the laser beam source 6 is possible. In this case, the third surface 32 is also used as the emission surface, and the diffractive optical element 1 is also adhered thereto. As a result, it is possible to emit two pairs of projected laser beams P. Of course, it is not possible to provide the light absorbing member on the third surface 32 in the transparent member 27 of this case. Instead, it is preferable to use an integrated structure obtained by allowing short side surfaces of smaller triangle pole prisms to face each other and interposing an appropriate light absorbing member 23 therebetween.

Third Example

Figure 26:
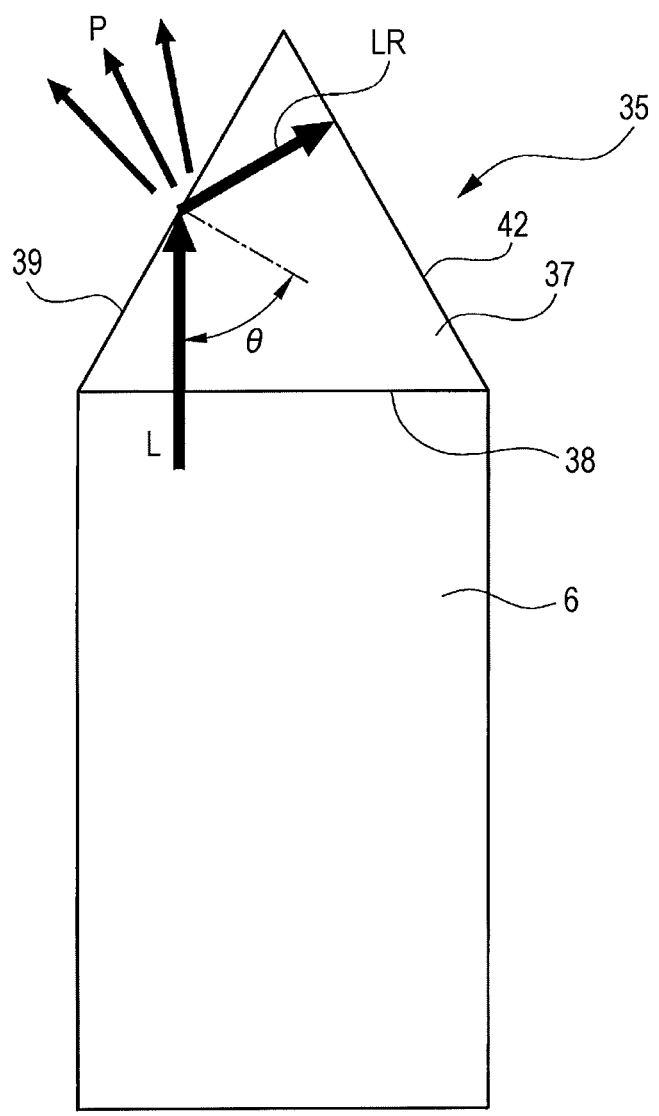
FIG. 26 is a cross-sectional view illustrating a configuration example (third example) of the image forming device.

An image projection device 35 in FIG. 26 is described as a third example. A transparent member 37 in the image projection device 35 in FIG. 26 is a triangle pole prism having a cross-section in an equilateral triangle. Other points are the same as those in the second example. In a configuration of the third example, the incident angle θ of the original laser beam L to an emission surface 39 is 60° which also satisfies the total reflection condition. Therefore, also with the configuration of the third example, it is possible to project the image as in the description above. Meanwhile, in the configuration example of the third example, the reflected laser beam LR is perpendicularly incident on a third surface 42 of the transparent member 37. Therefore, in this arrangement also, by providing an appropriate light absorbing member on the third surface 42, it is possible to absorb the reflected component of the laser beam. Needless to say, also in the third example, a variation of a two-beam system as illustrated in FIG. 25 is possible.

As described in detail above, according to this embodiment and each of the above-described examples, the transparent member is arranged on an optical path of the original laser beam L from the laser beam source 6. Then, the diffractive optical element 1 is provided on the emission surface of the light from the transparent member to the air ahead thereof. As a result, a diffraction grating is positioned on an interface from a high refractive area to a constant refractive area, and the original laser beam L is obliquely incident on the diffraction grating. As a result, as described above, the zeroth order light is eliminated by the total reflection or is positioned so as to be off-centered in the entire projected light. Also, the diffractive optical element 1 in which the direct image at the time of the perpendicular incidence appears in an area separated from both the zeroth order light and the conjugate image is used. As a result, the image projection device capable of easily projecting only the direct image on a projection screen is realized.

Figure 27:
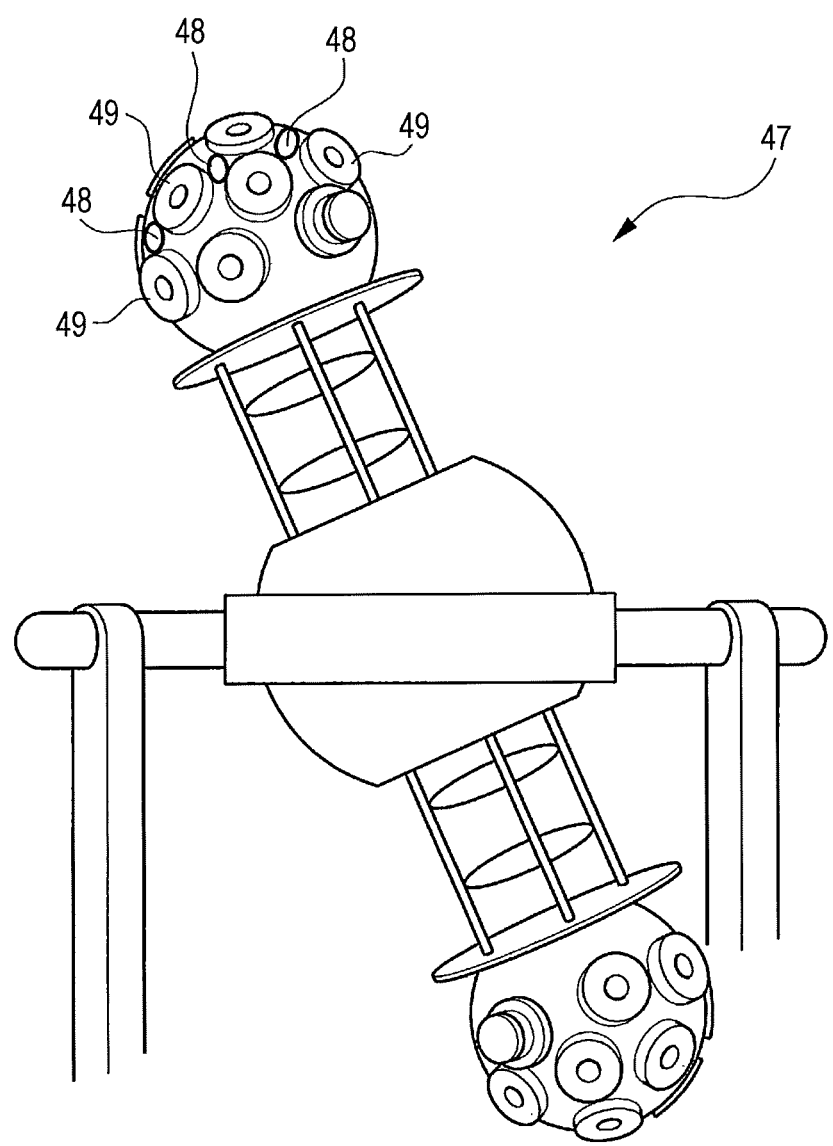
FIG. 27 is a front view of a planetarium projection device using the image projection device according to the embodiment.

The image projection device of this embodiment or each of the above-described examples is useful as, for example, a sub projecting unit 48 of a planetarium projection device 47 illustrated in FIG. 27. The planetarium projection device 47 includes a standard main projecting unit 49 in addition to the sub projecting unit 48. The sub projecting unit 48 is arranged between the main projecting units 49. A main image projected from the main projecting unit 49 is principally a starfield image. A sub image projected from the sub projecting unit 48 is the image of the spot group a shape of which is defined as the diffraction image (direct image 2) by the diffractive optical element 1 described above. With such planetarium projection device 47, it is possible to project the main image and the sub image on a dome screen so as to be overlapped with each other.

Figure 28:
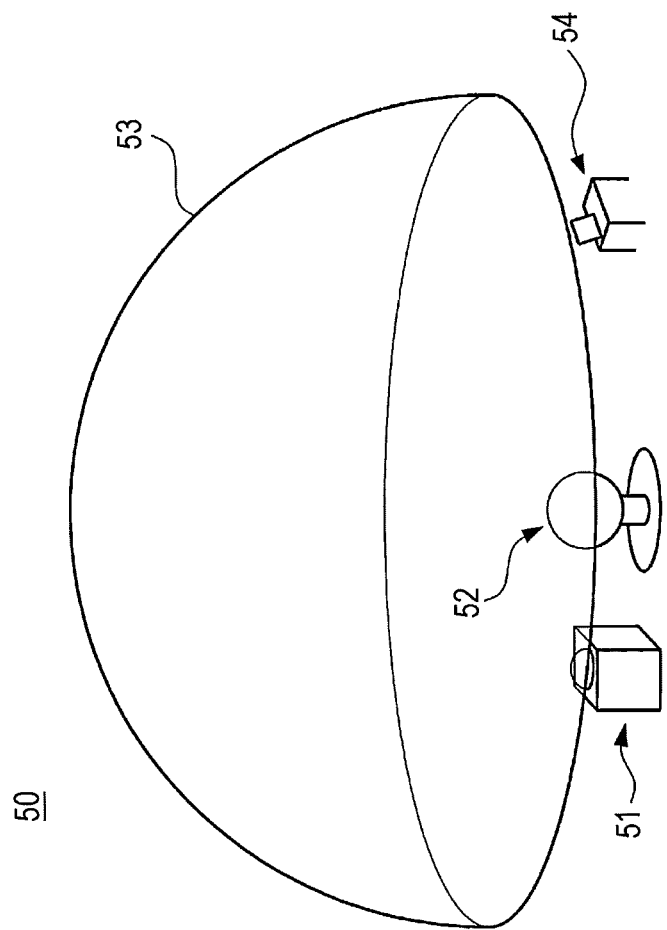
FIG. 28 is a perspective view of the planetarium projection device using the image projection device according to the embodiment.

The image projection device of this embodiment or each of the above-described examples is also useful as a sub image projection device 51 in a planetarium 50 as illustrated in FIG. 28. FIG. 28 illustrates a main image projection device 52, a dome screen 53, and an operation table 54 in addition to the projection device 51. The projection device 52 is an ordinary planetarium projection device without the sub projecting unit 48 described above. Instead, a configuration example in FIG. 28 is provided with the projection device 51 separately from the projection device 52. With such a configuration as well, the main image projected from the projection device 52 and the sub image projected from the projection device 51 are projected on the dome screen 53 in an overlapped manner.

Examples of the sub image include a picture and a connecting line illustrated accompanying with the arrangement of the stars in the constellation, for example. In the case of planetarium, a background is dark, so that it is required to completely eliminate the conjugate image. The same is true for the zeroth order light. In the image projection device according to this embodiment or each of the above-described examples, it is possible to eliminate the zeroth order light and the conjugate image without using a shielding plate or with a small shielding plate. Nevertheless, there is no need for the diffractive optical element such as a multi-stage diffraction grating which is difficult to manufacture. In this manner, very useful image projection device and planetarium may be realized.

Meanwhile, this embodiment and each of the above-described examples are merely an example and they do not limit the present invention at all. Therefore, the present invention may be naturally variously improved or modified without departing from the scope of the invention. For example, in each of the above-described examples, the total reflection condition is satisfied. However, as illustrated in FIG. 11, it is not indispensable that the total reflection condition be satisfied. Depending on a combination of the refractive index of the transparent member and the incident angle of the original laser beam L on the diffractive optical element 1, the total reflection condition may not be satisfied sometimes, but there still is a certain degree of usefulness as described above.

In each of the above-described examples, the transparent member and the diffractive optical element 1 are made of the same material, but this is also not indispensable. In any case, any material having high transparency to the original laser beam L and having a refractive index larger than the refractive index of air (medium in an area ahead) may be used. In addition, it is not indispensable to adhere the diffractive optical element 1 having the concavo-convex pattern formed on the substrate of such a material to the emission surface of the transparent member. Alternatively, the concavo-convex pattern may also be directly formed on the emission surface of the transparent member. Although the triangle pole prism is described as a specific shape of the transparent member, other shapes may also be used. In short, it is sufficient that the transparent member has a shape in which two nonparallel surfaces may be used as the incident surface and the emission surface.

In addition, in this embodiment and each of the examples described above, it is an advantage that a multistage pattern is not required as the concavo-convex pattern of the diffractive optical element 1, but this does not exclude usage of the diffractive optical element having the multistage pattern. Even if the conjugate image is eliminated by the diffractive optical element having the multistage pattern, the zeroth order light cannot be eliminated, so that applying the configuration of the present invention has an advantage of eliminating the zeroth order light.

Second Embodiment

Figure 29:
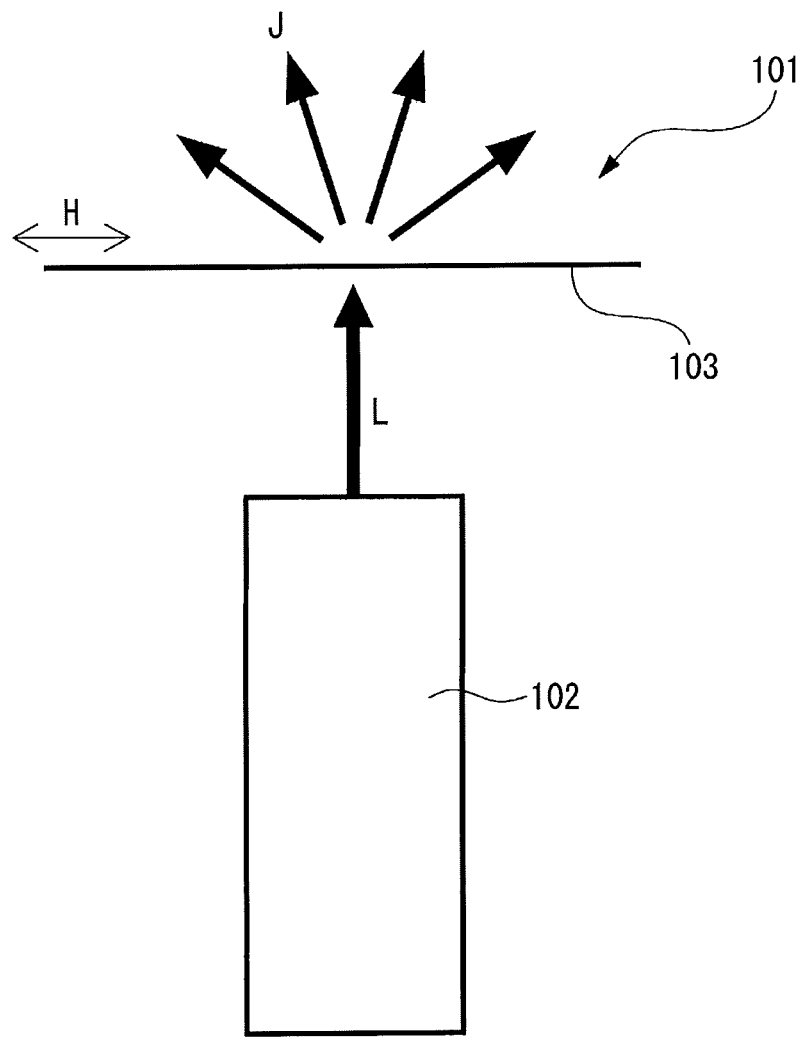
FIG. 29 is a front view of the image projection device according to the embodiment.

Next, a second embodiment is described. An image projection device 101 according to this embodiment is configured as illustrated in FIG. 29. The image projection device 101 in FIG. 29 includes a laser beam source 102 and a diffractive optical element plate 103. The laser beam source 102 is a laser oscillating unit that outputs a laser beam L. In an image projection device 101 of this embodiment, the diffractive optical element plate 103 is arranged on an optical path of the laser beam L output from the laser beam source 102. A projection space ahead of the diffractive optical element plate 103 is irradiated with a diffracted laser beam J obtained by diffracting the laser beam L by the diffractive optical element plate 103. In the image projection device 101 of this embodiment, the diffractive optical element plate 103 may be further moved in an in-plane direction intersecting with the optical path of the laser beam L (arrow H).

Figure 30:
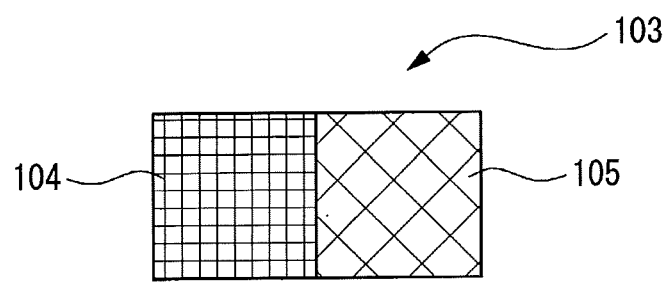
FIG. 30 is a plan view of the diffractive optical element plate according to the embodiment.
Figure 31:
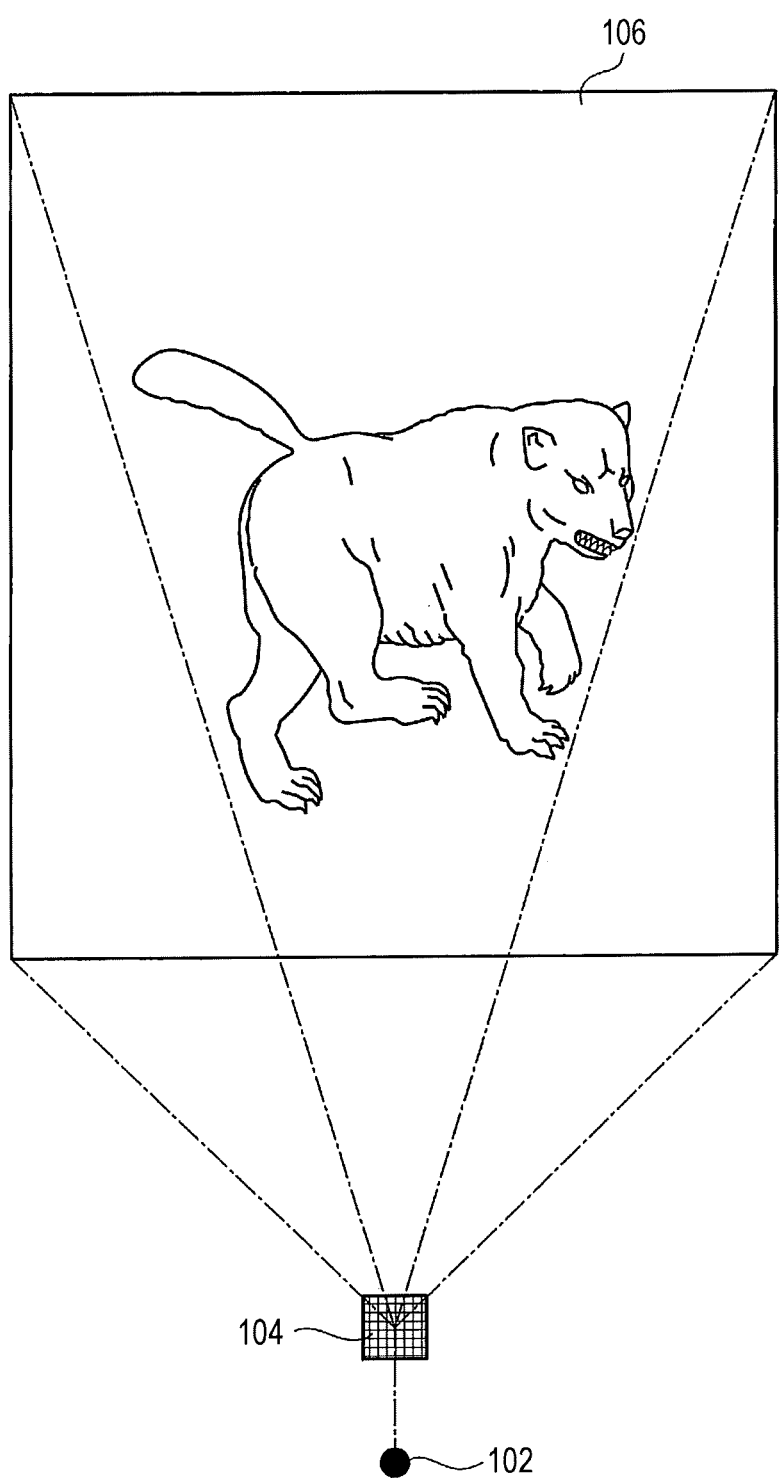
FIG. 31 is a schematic diagram illustrating formation of a diffraction image by a first area of the diffractive optical element plate according to the embodiment.
Figure 32:
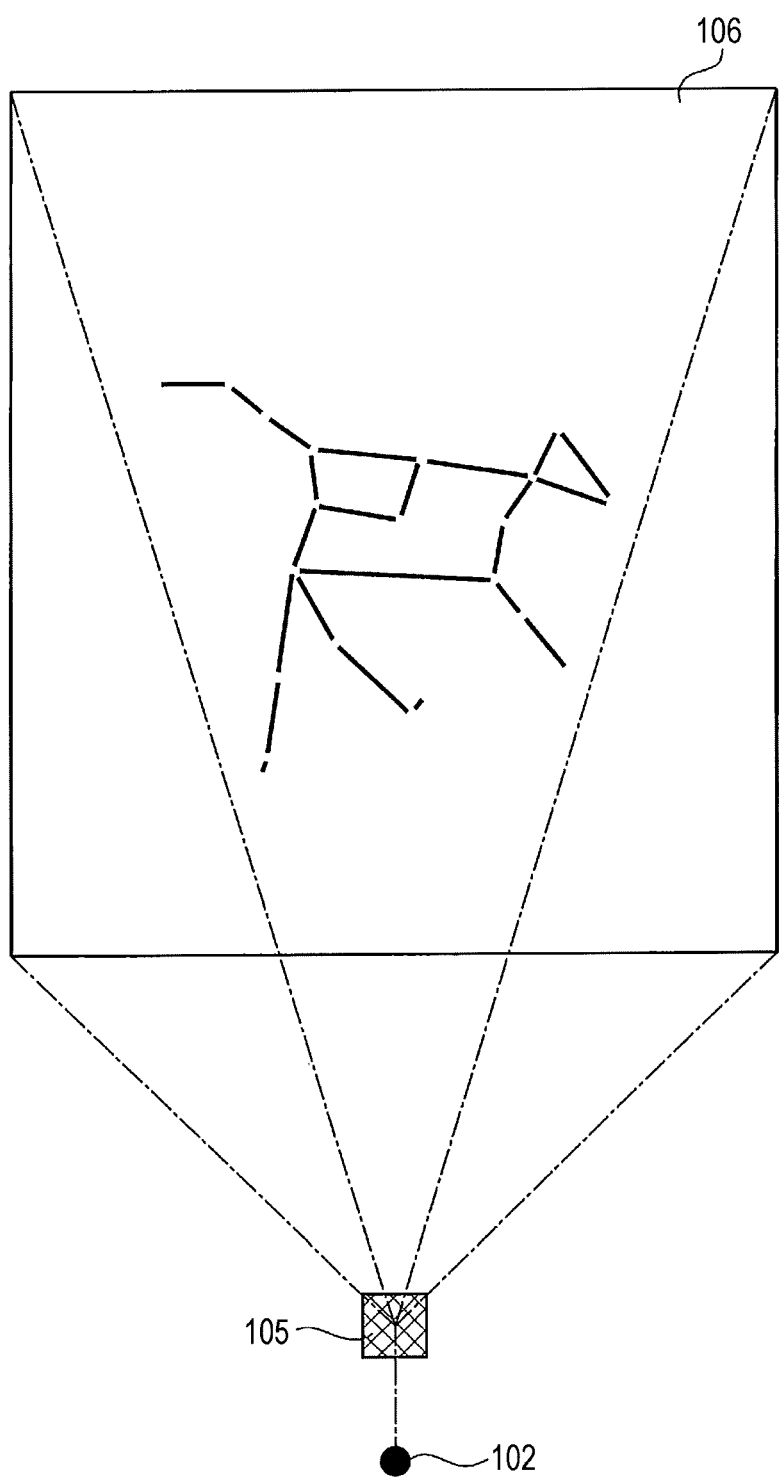
FIG. 32 is a schematic diagram illustrating formation of a diffraction image by a second area of the diffractive optical element plate according to the embodiment.
Figure 33:
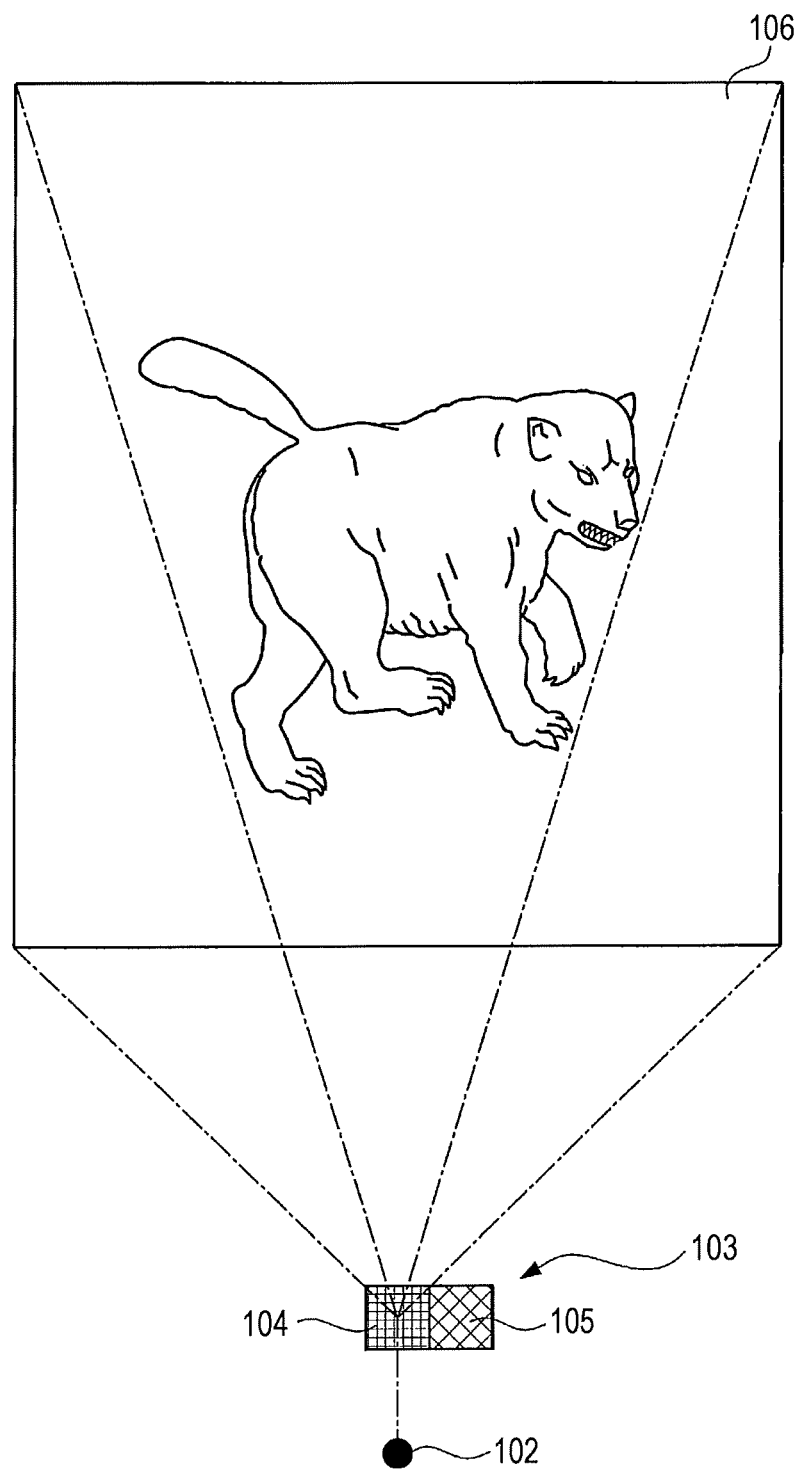
FIG. 33 is a schematic diagram illustrating a situation in which the first diffraction image is projected by the diffractive optical element plate according to the embodiment.
Figure 34:
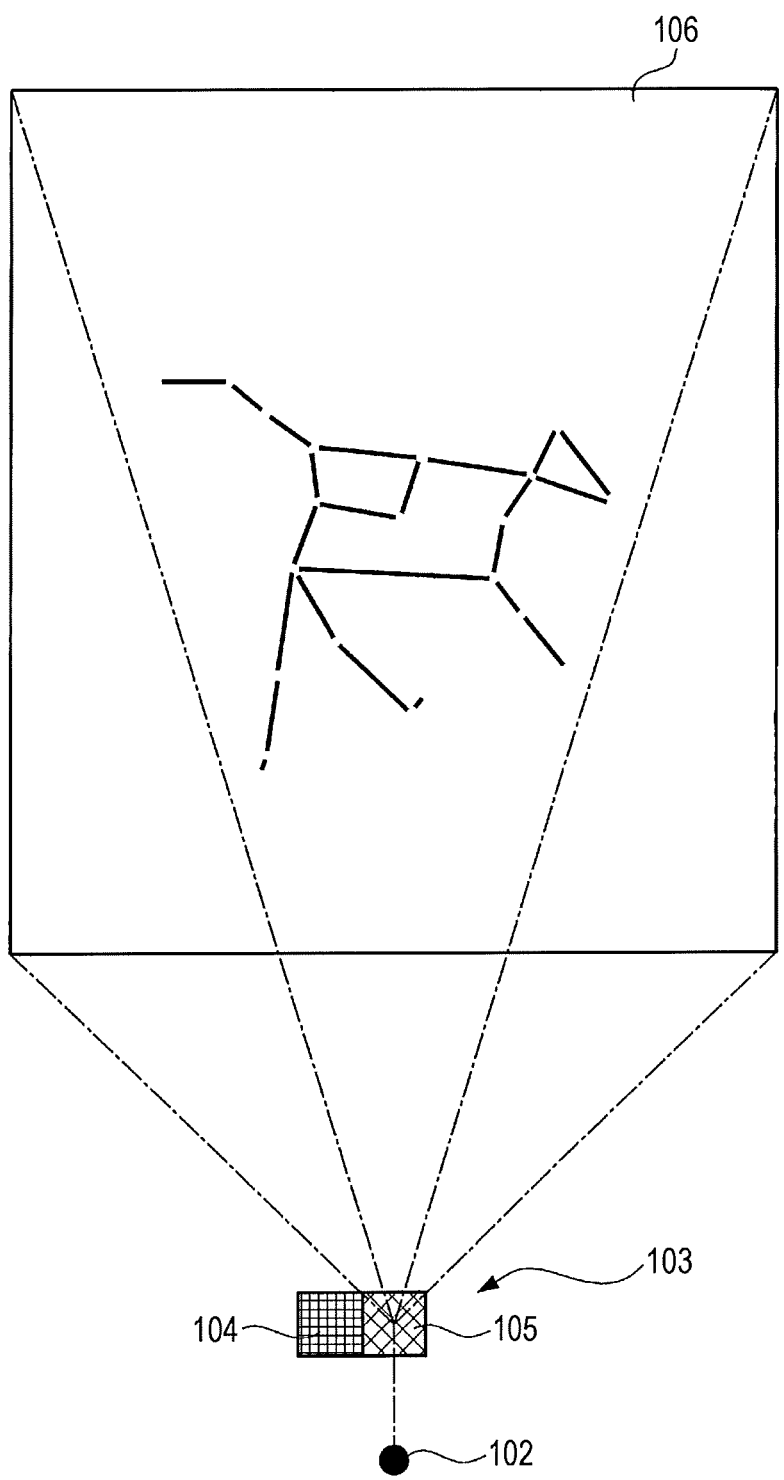
FIG. 34 is a schematic diagram illustrating a situation in which the second diffraction image is projected by the diffractive optical element plate according to the embodiment.

As illustrated in FIG. 30, the diffractive optical element plate 103 in this embodiment includes a first area 104 and a second area 105. Both of the first area 104 and the second area 105 are diffraction gratings on which a CGH pattern is formed. The first area 104 and the second area 105 generate different diffraction images. Herein, it is assumed that the first area 104 is designed to illustrate a picture of Ursa Major (FIG. 31) and the second area 105 is designed to illustrate a marker line group of Ursa Major (FIG. 32) on a screen 106, respectively. Therefore, in the image projection device 101 of this embodiment, it is possible to switch the image to be projected on the screen 106 by moving the diffractive optical element plate 103 as indicated by arrow H in FIG. 29. FIG. 33 illustrates a situation in which a first diffraction image (constellation picture) is projected using the first area 104. FIG. 34 illustrates a situation in which the second diffraction image (marker line group) is projected using the second area 105.

Meanwhile, the projected image is illustrated in black on a white background on the screen 106 in FIGS. 31 to 34, but this is for convenience of drawing, and it is to be noted that the contrast is reversed on an actual screen. That is, on the actual screen, the background is dark, and a bright projected image appears on this. The same applies in all the drawings in which the "screen 106" appears below.

As described above, in the image projection device 101 of this embodiment, it is possible to switch and project two types of diffraction images. Herein, there are two advantages to be described hereinafter. The first advantage is that required positional accuracy of the diffractive optical element plate 103 is not so high. The second advantage is that it is possible to switch between the two images without giving a viewer uncomfortable feeling.

First, the first advantage is described. This advantage is obtained because the principle of image formation is a diffraction phenomenon illustrated in FIG. 35. That is, an irradiation direction of the diffracted laser beam J by the diffractive optical element plate 3 is determined as a diffraction angle $\psi$ with respect to the irradiation direction of the original laser beam L. The diffraction angle $\psi$ is determined only by a wavelength of the laser beam L and a grating constant of the diffractive optical element plate 103 irrespective of a position on the diffractive optical element plate 103 on which the laser beam L is incident. Since the diffraction angle $\psi$ is constant in this manner, the projected image is projected in a position that is apart to a certain degree in the direction of the diffraction angle $\psi$ from an incident position of the laser beam L on the diffractive optical element plate 103. Therefore, only if the arrangement of the laser beam source 102 is surely fixed, even if the accuracy of a stop position of the diffractive optical element plate 103 is low, this does not affect the position of the projected image. The positional accuracy such that an irradiation range on the diffractive optical element plate 103 of the laser beam L overlaps only with a target one of the first area 104 and the second area 105 and does not overlap with the other is sufficient.

Figure 35:
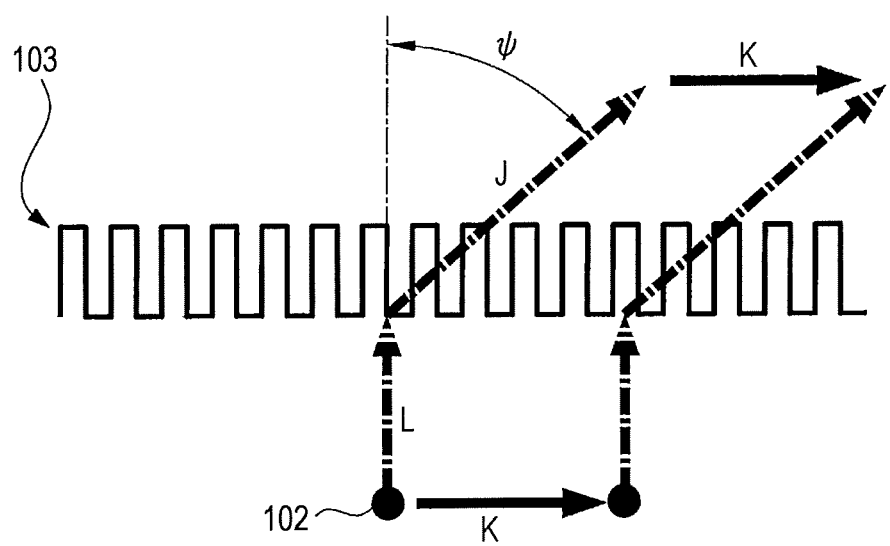
FIG. 35 is a schematic diagram illustrating positional accuracy of the projected image by the diffractive optical element.

If the position of the laser beam source 102 is shifted as indicated by arrow K in FIG. 35, a shift amount is directly reflected in the position of the projected image. However, unlike a projector using a conventional lens, this is not enlarged by an optical system. That is, if the positional shift of the laser beam source 102 is at the millimeter level, the positional shift of the projected image on the screen 106 is also at the millimeter level. Therefore, if the positional shift is within a range of ordinary attaching accuracy of the laser beam source 102, the viewer will not perceive the positional shift of the projected image.

Figure 36:
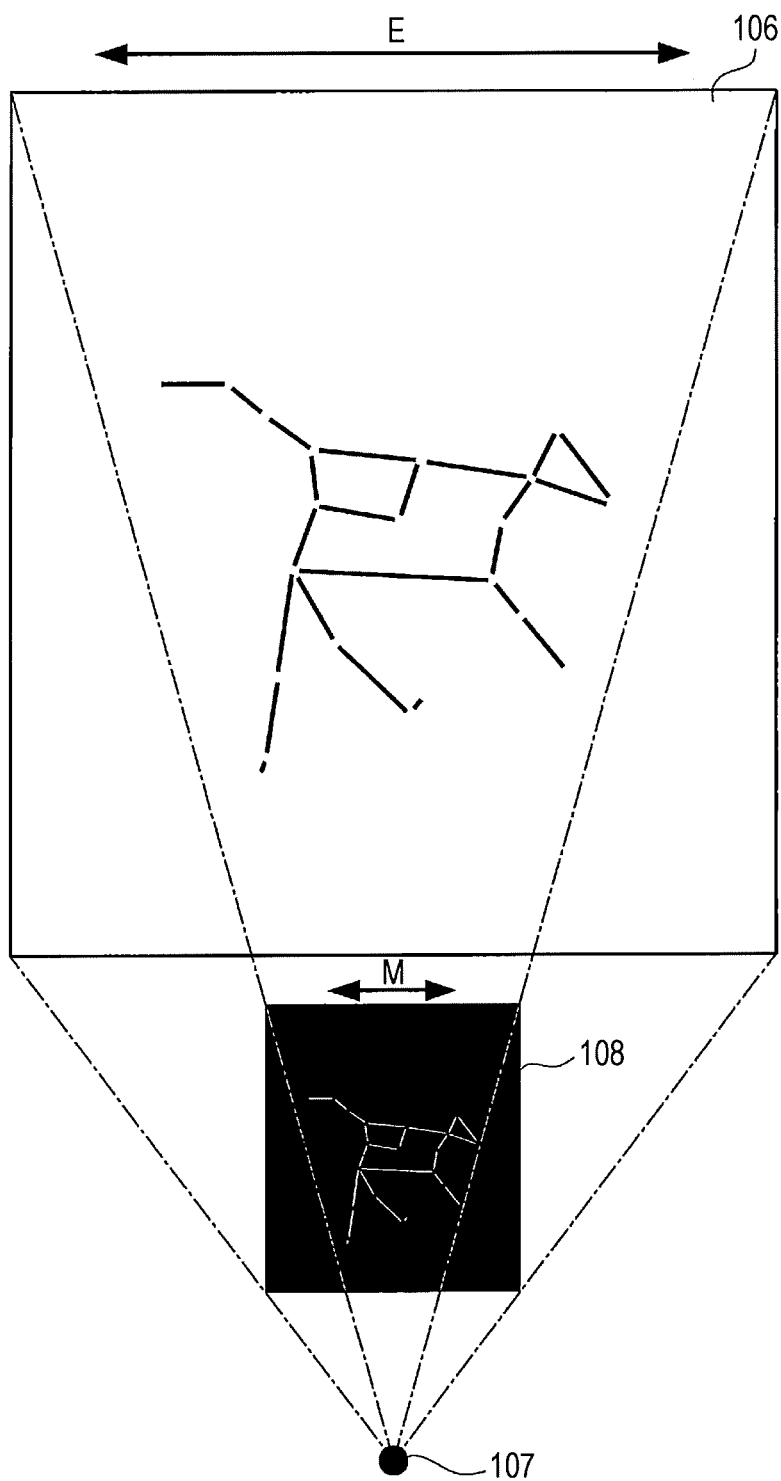
FIG. 36 is a schematic diagram illustrating positional accuracy of a projected image by a transmission original plate (Comparative Example).

This is a difference from a case of image projection by a conventional transmission original plate. As illustrated in FIG. 36, in a case where an image is projected on the screen 106 using a diffusion light source 107 and the transmission original plate 108, a positional shift amount M of the transmission original plate 108 is optically greatly enlarged and reflected in the screen 106 (arrow E). Therefore, in this method, extremely high accuracy is required for the stop position of the transmission original plate 108. On the other hand, in this embodiment, as described above, the required accuracy of the stop position of the diffractive optical element plate 103 is not so high.

Figure 37:
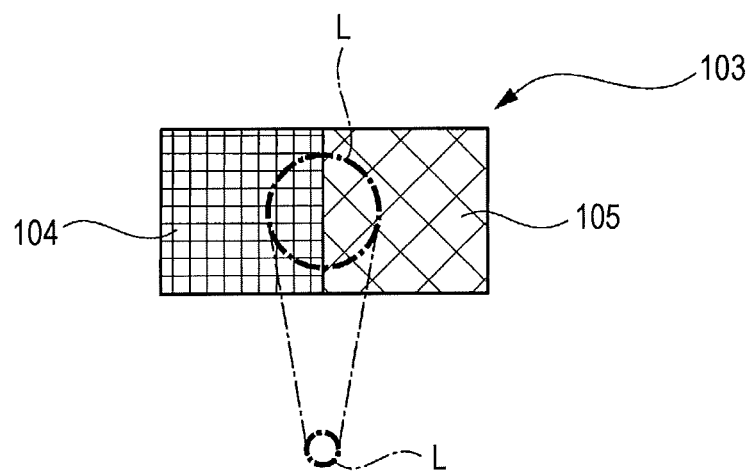
FIG. 37 is a schematic diagram illustrating an irradiation situation of a laser beam to the diffractive optical element plate at the time of image switching.
Figure 38:
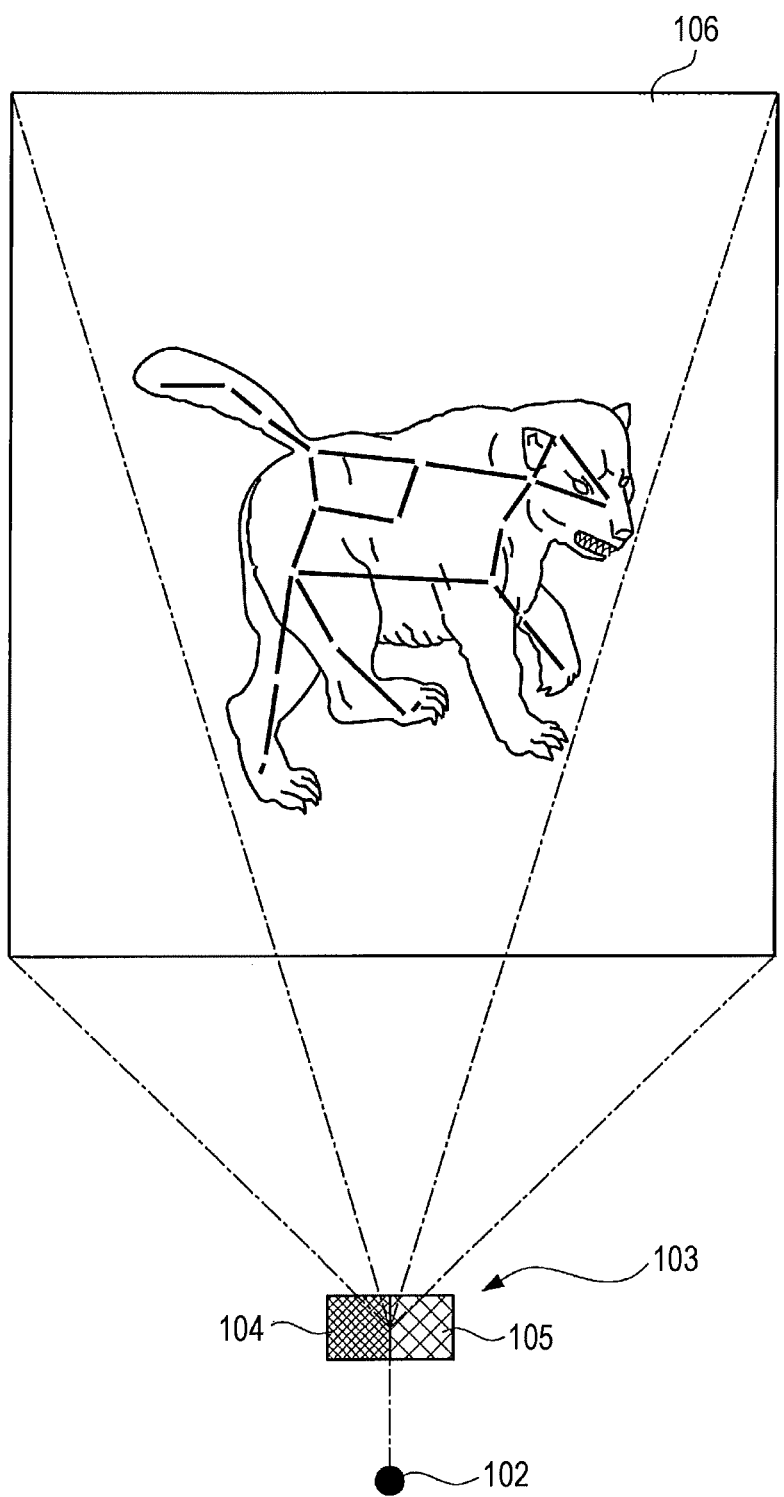
FIG. 38 is a schematic diagram illustrating projection of the diffraction image in the situation in FIG. 37.

Next, the second advantage is described. This advantage is also obtained by forming an image using the diffraction phenomenon. In the course of switching from the situation in FIG. 33 to the situation in FIG. 34 described above, as illustrated in FIG. 37, there is a timing at which both the first area 104 and the second area 105 are irradiated with the laser beam L. At that timing, as illustrated in FIG. 38, the diffraction image (constellation picture) by the first area 104 and the diffraction image (marker line group) by the second area 105 are overlapped with each other to be displayed on the screen 106. The position of the image of the constellation picture on the screen 106 in the situation in FIG. 38 is the same as the position of the image in the situation in FIG. 33. Similarly, the position of the image of the marker line group is the same in FIGS. 38 and 34. The reason for this is as described in the above-described "first advantage".

Therefore, an actual situation of the projected image on the screen 106 at the time of switching the image in this embodiment is as follows. It is assumed that an initial state is the state in which the constellation picture is projected illustrated in FIG. 33. When the image switching starts, it enters a situation in which the image of the marker line group appears slightly to be overlapped with the constellation picture in FIG. 33. Then, as the image switching progresses (that is, the diffractive optical element plate 3 moves), the image of the marker line group becomes gradually brighter to reach the state illustrated in FIG. 38. As the switching further progresses, the image of the constellation picture gradually fades away. When the image of the constellation picture finally disappears to reach the state illustrated in FIG. 34, switching is completed. Of course, even in the case of switching from the state in FIG. 34 to the state in FIG. 33, the same is true only with the constellation picture and the marker line group interchanged.

In the course of the image switching, neither the constellation picture nor the marker line group moves on the screen 106 and they remain at their original projected positions. The reason for this is as described above. Therefore, it seems from the viewer that the image on the screen 106 gradually transits from one of the constellation picture and the marker line group to the other. That is, this image switching is very natural from a perspective of the viewer. It is also possible to daringly stop the movement of the diffractive optical element plate 103 in the state in FIG. 38 and statically project in an overlapped image mode. Meanwhile, it is undeniable that the constellation picture and the marker line group in the course of the image switching described above are darker than those in a single image mode in FIG. 33 and FIG. 34. This is because energy of the original laser beam L is distributed to both images. Therefore, in the course of the image switching, it is possible to maintain brightness of the image by increasing a light amount of the laser beam source 102.

Figure 39:
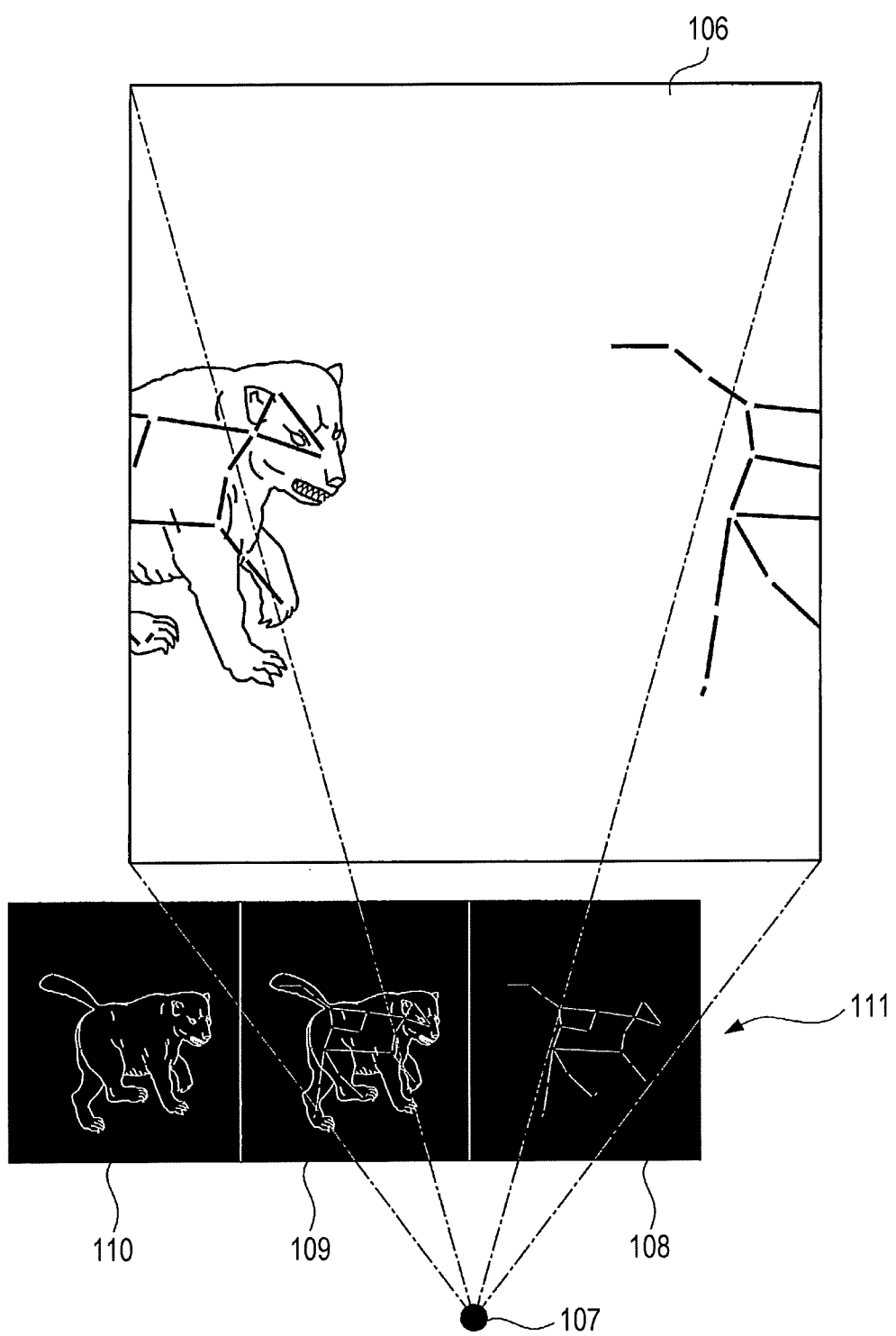
FIG. 39 is a schematic diagram illustrating a situation at the time of switching the projected image by the transmission original plate (Comparative Example).

A point that natural image switching may be done in this manner is also different from the case of the image projection by the conventional transmission original plate. As illustrated in FIG. 39, when the images are switched by projection by the diffusion light source 107 and a transmission original plate 111, a projected image in which a part of two images are arranged halfway appears on the screen 106. FIG. 39 illustrates a situation in the process of transition from projection by a portion of a transmission original plate 108 to projection by a portion of a transmission original plate 109 in the transmission original plate 111. At the time of switching the projected image by the transmission original plate, the former image exits to one side and the next image enters from the other side instead, so that a projection situation as illustrated in FIG. 39 appears. Of course, both the previous image and the next image move on the screen 106 during that time. The projection situation as illustrated in FIG. 39 seems to be unnatural from the viewer.

Meanwhile, in the case illustrated in FIG. 39, it is possible to project the overlapped images as illustrated in FIG. 38. However, this is because a transmission original plate 109 which is an area for projecting the overlapped image itself is prepared in the transmission original plate 111. The image of the transmission original plate 108 and the image of the transmission original plate 110 cannot be overlapped to be projected. On the other hand, in this embodiment, natural image switching is possible as described above. In addition, it is not necessary to provide the area corresponding to the transmission original plate 109 in FIG. 39 in the diffractive optical element plate 103.

Figure 40:
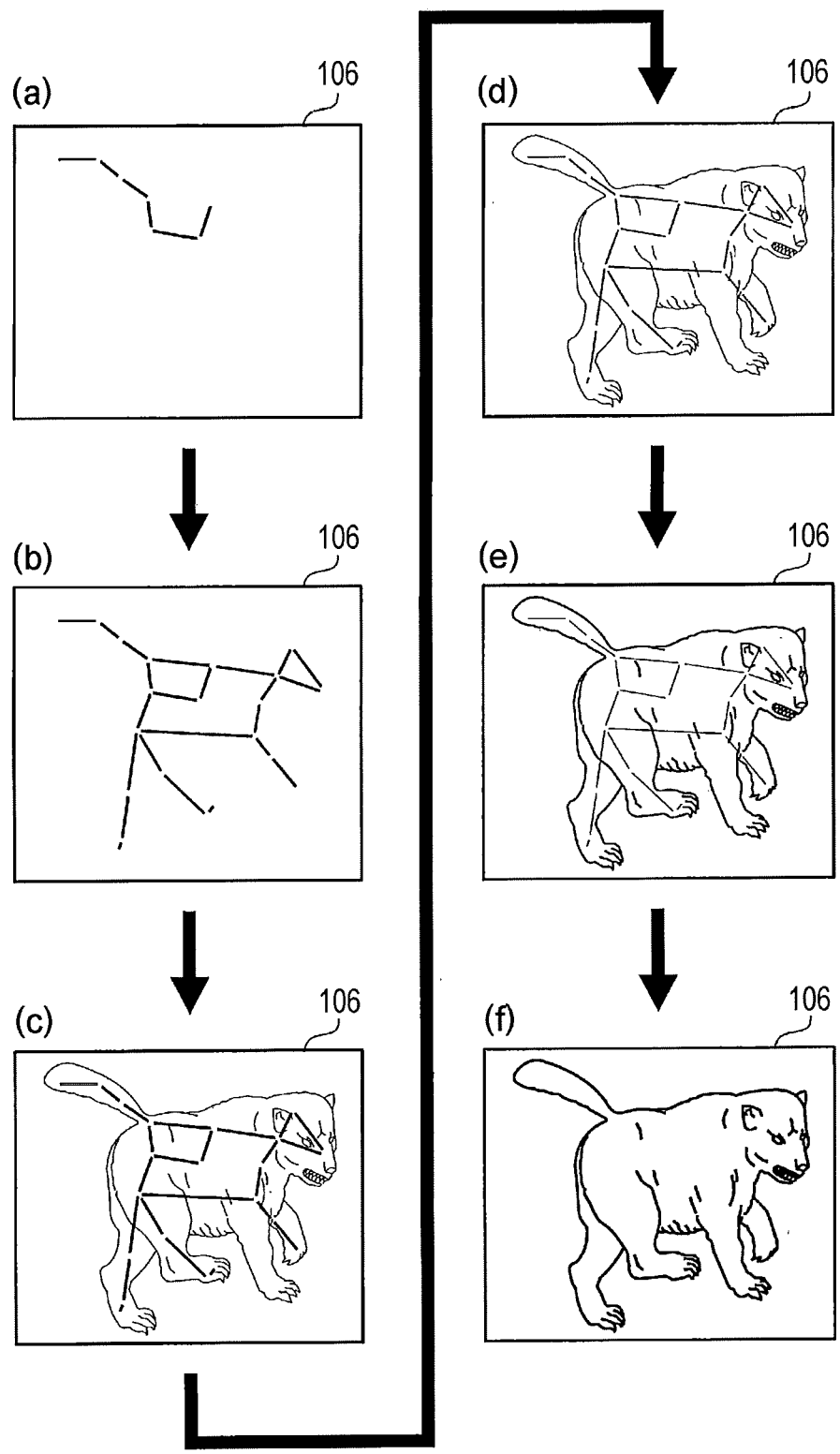
FIG. 40 is a schematic diagram illustrating a presentation example of the projection by the image projection device according to the embodiment.
Figure 41:
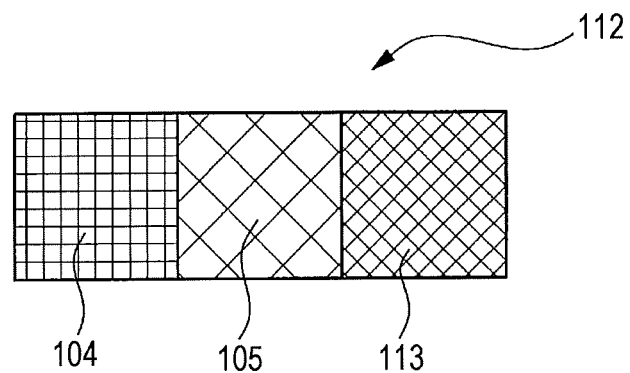
FIG. 41 is a plan view of the diffractive optical element plate for performing the presentation in FIG. 40.

Using characteristics of the image projection device 101 of this embodiment as described above, it is possible to perform presentation as illustrated in FIG. 40. FIG. 40 illustrates a state how the image projected on the screen 106 changes from (a) to (f) in order. In order to perform the presentation in FIG. 40, a diffractive optical element plate 112 in FIG. 41 is used. The diffractive optical element plate 112 in FIG. 41 is obtained by adding a third area 113 to the diffractive optical element plate 103 in FIG. 30. As illustrated in (a) of FIG. 41, the third area 113 is a diffraction grating on which the CGH pattern for projecting only a portion corresponding to the Big Dipper out of the marker line group of Ursa Major is formed.

In the presentation in FIG. 40, as illustrated in (a), a marker line group of the Big Dipper is projected on the screen 106 using the third area 113 of the diffractive optical element plate 112. The screen 106 when the diffractive optical element plate 112 is moved from this state to reach a state in which the projection by the second area 105 is performed is illustrated in (b). The projected image at that time is the same as that illustrated in FIG. 34. Herein, in the eyes of the viewer, it seems that the marker line group corresponding to a portion other than the Big Dipper out of those of Ursa Major gradually stands out while the marker line group of the Big Dipper remains as it is when it changes from the state of (a) to the state of (b).

As the diffractive optical element plate 112 is further moved from the state of (b), the projected image changes from (c) to (d), (e), and (f). That is, the constellation picture appears slightly as described above (c). As the constellation picture becomes gradually brighter, the marker line group (including the portion of the Big Dipper) gradually becomes darker ((d) and (e)). A state in which the marker line group completely disappears is (f), and at that time, in the diffractive optical element plate 112, only the first area 104 is irradiated with the laser beam L. The change in brightness of the constellation picture and the marker line group in the course from (c) to (e) is caused by the change in area ratio of a portion actually irradiated with the laser beam L in the second area 105 and the first area 104.

Figure 42:
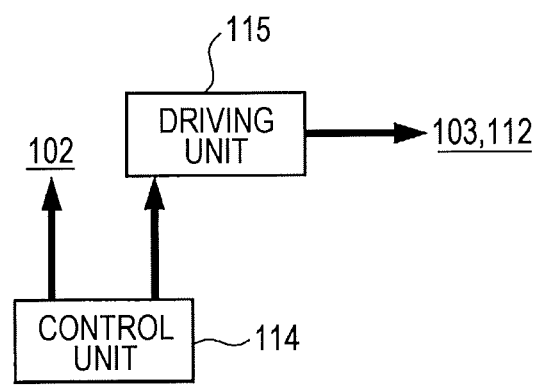
FIG. 42 is a block diagram illustrating a configuration of a control system of the image projection device according to the embodiment.

Herein, a configuration of a control system of the image projection device 101 of this embodiment is described. The control system of the image projection device 101 is configured as illustrated in FIG. 42. The control system in FIG. 42 includes a control unit 114 and a driving unit 115. The control unit 114 is a part that performs light emission control of the laser beam source 102 and movement control of the diffractive optical element plates 103 and 112. The driving unit 115 is a mechanical part that moves the diffractive optical element plates 103 and 112 under the control of the control unit 114 and is configured by a combination of known motors, gears and the like.

Among control functions of the control unit 114 in this embodiment, the movement control of the diffractive optical element plates 103 and 112 is briefly the control of moving the diffractive optical element plates 103 and 112 for switching between the projected images such as the constellation picture and the marker line group. This includes the above-described single image mode (FIGS. 33 and 34 and (a), (b), and (f) of FIG. 40) and overlapped image mode (FIG. 38 and (c) to (e) of FIG. 40). In addition, the light emission control of the laser beam source 102 includes a light amount increasing control when switching the projected image described above. Of course, also when the diffractive optical element plates 103 and 112 are stopped in the state of the overlapped image mode, the light amount may be increased. Also, from the start to the end of the image switching, the amount of increased light may be made constant, or the amount of light may change in a mountainous manner.

Figure 43:
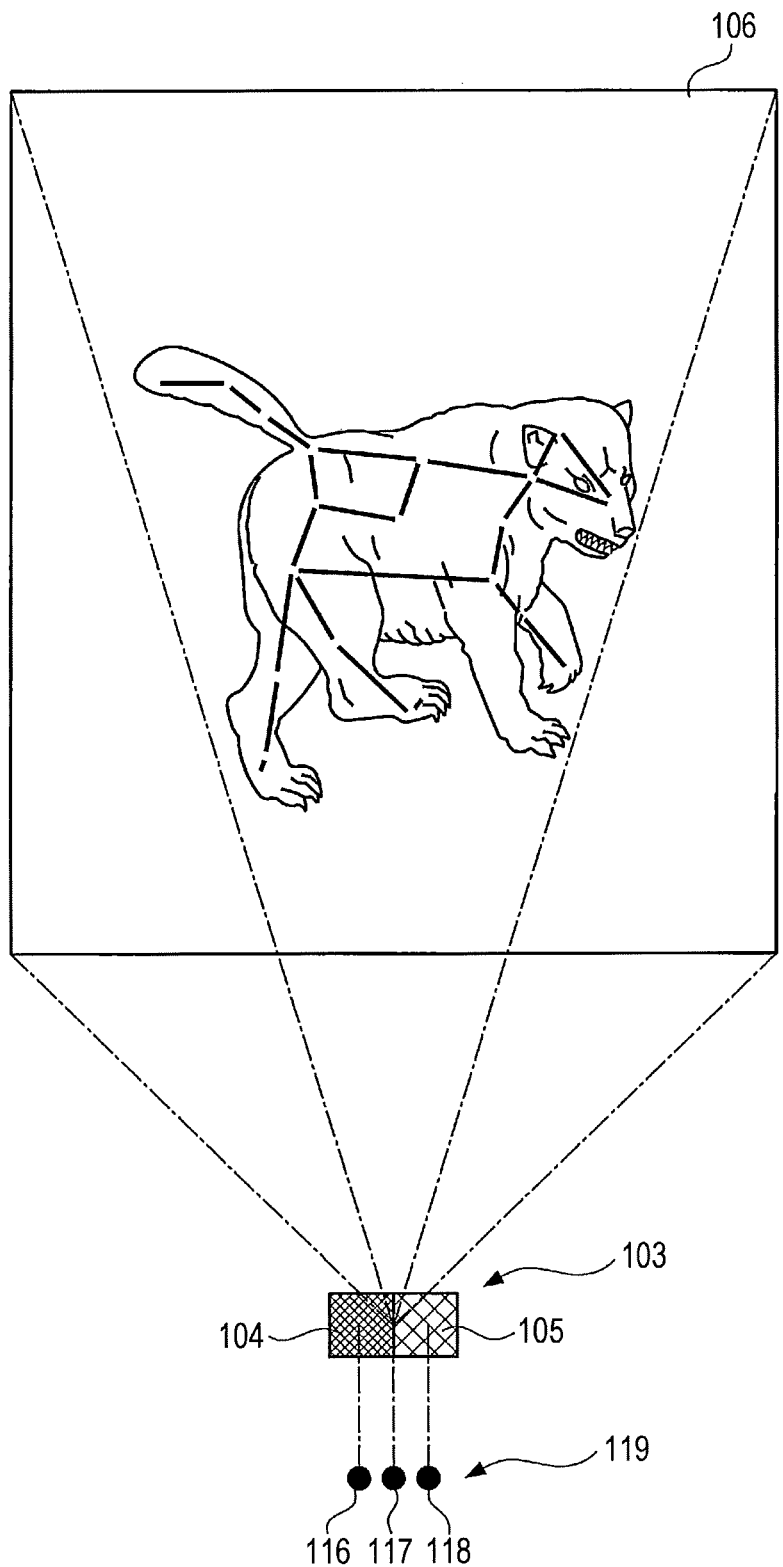
FIG. 43 is a schematic diagram of an image projection device according to a variation.

As a variation of the image projection device 101 of this embodiment, there is one illustrated in FIG. 43. In this variation, instead of moving the diffractive optical element plate 103, a plurality of emitting units of the laser beam source is provided. That is, in the configuration example in FIG. 43, a laser beam source 119 including three emitting units 116 to 118 is used. The emitting unit 116 is an emitting unit for projecting in the single image mode by the first area 104 of the diffractive optical element plate 103. The emitting unit 117 is an emitting unit for projecting in the overlapped image mode by the first area 104 and the second area 105 of the diffractive optical element plate 103. That is, the emitting unit 117 is arranged in a position where the emitted laser beam irradiates both the first area 104 and the second area 105. The emitting unit 118 is an emitting unit for projecting in the single image mode by the second area 105 of the diffractive optical element plate 103.

The switching control of the projected images in the case of this variation is performed by switching among the emitting units 116 to 118 which is actually allowed to emit light. Herein, two or more of the emitting units 116 to 118 may be allowed to emit light at the same time. In addition, the light emission amounts of the emitting units 116 to 118 may be gradually increased or decreased individually. As a result, it is possible to perform the presentation as illustrated in (b) to (f) of FIG. 40. In addition, the emitting unit 117 out of the emitting units 116 to 118 is not indispensable. This is because the overlapped image mode may be realized by simultaneously allowing the emitting units 116 and 118 to emit light without allowing the emitting unit 117 to emit light.

Strictly considering here, if the diffractive optical element plate 3 is exactly the same as that in FIG. 38 in the configuration example in FIG. 43, the position of the constellation picture is slightly shifted from the position of the marker line group on the screen 106. However, the shift amount is not enlarged just like the interval among the emitting units 116 to 118 in the laser beam source 119. Therefore, this is not the shift amount which is noticeable to the viewer on the screen 106. Because, for example, in the case of the planetarium, the projected image is projected in a size of about several meters square in a position apart by about 10 m. In contrast, since the interval of the emitting units 116 to 118 is usually only about 2 to 4 mm, the projected image of several meters square is shifted by about 2 to 4 mm. This may be said to be merely an error range. The interval of the emitting units 116 to 118 is adjusted to the size of the first area 104 and the second area 105 in the diffractive optical element plate 103. This is because a beam system of the laser beam L is usually about 1 to 3 mm.

The image projection device of this embodiment is also useful as the sub projecting unit 48 of the planetarium projection device 47 illustrated in FIG. 27, for example. The sub image projected from the sub projecting unit 48 is an image the shape of which is defined as the diffraction image by the above-described diffractive optical element plates 103 and 112. For example, it is possible to overlap the constellation picture or the marker line group projected from the sub projecting unit 48 or both of them with a star image projected from the main projecting unit 49. The image projection device of this embodiment is also useful as the sub image projection device 51 in the planetarium 50 as illustrated in FIG. 28.

The diffractive optical element 1 according to the first embodiment may also be formed just like the diffractive optical element plates 103 and 112 of this embodiment. In addition, in the planetarium projection device 47 in FIG. 27, both of the sub projecting unit 48 as in the first embodiment and that in this embodiment may be provided.

As described in detail above, according to this embodiment, the diffractive optical element plates 103 and 112 are arranged on the optical path of the laser beam L, and at least the first area 104 and the second area 105 are formed on the diffractive optical element plates 103 and 112. The projection in the single image mode and the projection in the overlapped image mode may be performed by the movement of the diffractive optical element plates 103 and 112 in the in-plane direction or by appropriately using a plurality of emitting units 116 to 118. As a result, the image projection devices 101, 48, and 51, and the planetarium 50 capable of not only switching the two or more different images to project but also projecting the individual images on their original projection positions even during the switching of the images are realized.

Meanwhile, this embodiment is merely an example and this does not limit the present invention at all. Therefore, the present invention may be naturally variously improved or modified without departing from the scope of the invention. For example, when switching the image to be projected, the movement of the diffractive optical element plates 103 and 112 in the in-plane direction and the selective use of a plurality of emitting units 116 to 118 may be used together.

Figure 44:
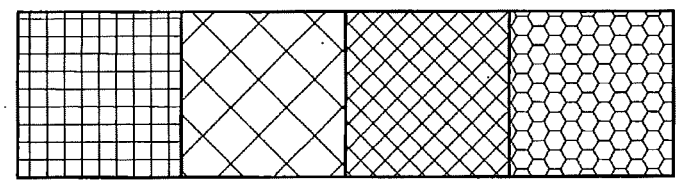
FIG. 44 is a plan view illustrating an arrangement example (straight line shape) of a CGH area in the diffractive optical element plate.
Figure 45:
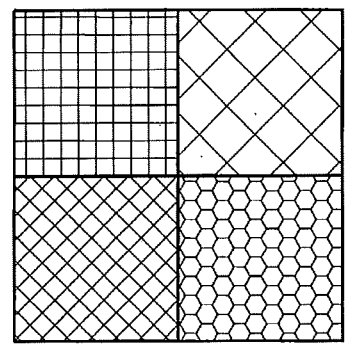
FIG. 45 is a plan view illustrating an arrangement example (two-dimensional shape) of the CGH area in the diffractive optical element plate.
Figure 46:
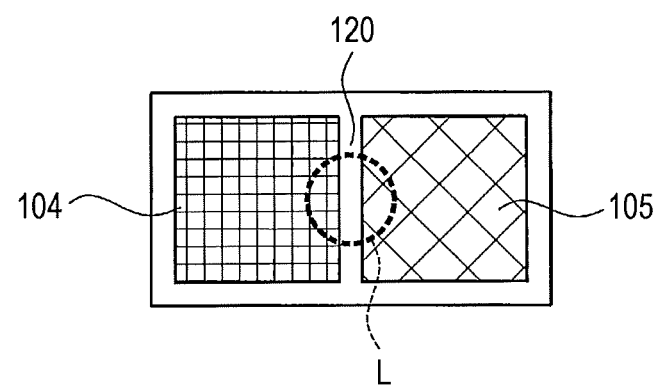
FIG. 46 is a plan view illustrating an arrangement example (with a gap) of the CGH area in the diffractive optical element plate.

Also, the number of CGH areas in the diffractive optical element plates 3 and 12 may be four or larger. The arrangement of the CGH areas on the diffractive optical element plate having four or more CGH areas may be in a straight line as illustrated in FIG. 44, or may be two-dimensional as illustrated in FIG. 45. In a case of the two-dimensional arrangement as illustrated in FIG. 45, it is possible to perform overlapped simultaneous projection of diffraction images of up to four types is possible. In addition, as illustrated in FIG. 46, a gap 120 may be present between the CGH areas. However, the gap 120 is desirably made of a material opaque to the laser beam L. In order not to disturb the projection in the overlapped image mode, a width of the gap 120 is desirably one-third or less of a beam diameter of the laser beam L. In a case where the gap 120 is provided in the two-dimensional arrangement in FIG. 45, it is preferable that a length of a diagonal line at an intersection of the gap 120 be one-third or less of the beam diameter of the laser beam L.

REFERENCE SIGNS LIST

1 Diffractive optical element
2 Direct image (diffraction image)
3 Zeroth order light image
4 Conjugate image
5 Image projection device
6 Laser beam source
7 Transparent member
8 Incident surface
9 Emission surface
15 Image projection device
17 Transparent member
18 Incident surface
19 Emission surface
24 Oblique side (maximum inclination direction)
25 Image projection device
27 Transparent member
28 Incident surface
29 Emission surface
35 Image projection device
37 Transparent member
38 Incident surface
39 Emission surface
47 Planetarium projection device
48 Sub projecting unit
49 Main projecting unit
50 Planetarium
51 Projection device (sub image)
52 Projection device (main image)
53 Dome screen 101 Image projection device
102, 119 Laser beam source
103, 112 Diffractive optical element plate
104 First area
105 Second area
106 Screen
113 Third area
114 Control unit
116 to 118 Emitting unit

The invention claimed is:

1. An image projection device comprising:
a laser oscillator which outputs a laser beam; and
a diffractive optical element provided on an optical path of the laser beam output from the laser oscillator which generates diffracted light based on diffraction of the laser beam,
the image projection device that projects a diffraction image defined as a shape of a spot group by the diffracted light on a screen, including
a transparent member arranged on the optical path of the laser beam output from the laser oscillator, including an incident surface and an emission surface which are flat surfaces, having a refractive index higher than the refractive index of an area ahead of the emission surface, and is transparent to the laser beam,
wherein the transparent member includes the diffractive optical element formed on the emission surface, and
is arranged such that the laser beam output from the laser oscillator is obliquely incident on the diffractive optical element, and
the diffractive optical element generates the diffraction image in an area not overlapped with zeroth order light of the incident laser beam and not overlapped with an area occupied by a conjugate image, and
is arranged in a direction to irradiate a screen with the diffracted light forming the diffraction image while substantially eliminating the zeroth order light and the diffracted light forming the conjugate image.

2. The image projection device according to claim 1, wherein a total reflection condition is satisfied regarding the laser beam output from the laser oscillator on the emission surface, and
the diffractive optical element is arranged in a direction in which entire diffracted light forming the diffraction image is included and the diffracted light forming the conjugate image is not included in an area where light may be emitted from the transparent member even under the total reflection condition.

3. The image projection device according to claim 1, wherein the transparent member is such that the incident surface and the emission surface are not parallel to each other.

4. The image projection device according to claim 3, wherein the transparent member is a triangle pole prism.

5. The image projection device according to claim 1, wherein the number of stages of the diffractive optical element is two.

6. The image projection device according to claim 1, wherein the diffractive optical element is provided with a first diffraction grating area for generating a first diffraction image and a second diffraction grating area for generating a second diffraction image,
a projection mode switcher which performs mode switching for the projection of the diffraction image by the diffractive optical element is included, and
a projection mode switched by the projection mode switcher includes a single image mode in which the diffraction image is projected using only one of the first diffraction grating area and the second diffraction grating area, and
an overlapped image mode in which the diffraction image is projected using both the first diffraction grating area and the second diffraction grating area.

7. The image projection device according to claim 6, wherein the projection mode switcher performs the mode switching by moving the diffractive optical element in an in-plane direction intersecting with the optical path of the laser beam output from the laser oscillator.

8. The image projection device according to claim 7 that performs the projection in the overlapped image mode by the laser beam irradiating both the first diffraction grating area and the second diffraction grating area during transition from a first single image mode using the first diffraction grating area to a second single image mode using the second diffraction grating area by the movement of the diffractive optical element.

9. The image projection device according to claim 6, wherein the laser oscillator includes a plurality of emitters from which the laser beam is emitted, and
the projection mode switcher performs the mode switching by switching an emitter to be used among the plurality of emitters.

10. The image projection device according to claim 9, wherein there is the emitter arranged in a position where the emitted laser beam irradiates both the first diffraction grating area and the second diffraction grating area among the plurality of emitters, and
in the overlapped image mode, the emitter arranged in the position among the plurality of emitters projects the diffraction image.

11. The image projection device according to claim 6, wherein the laser oscillator increases a light amount when the projection mode by the projection mode switcher is the overlapped image mode than the amount in the case of the single image mode.

12. A planetarium comprising:
a dome screen; and
a first image projection device and a second image projection device for projecting an image on the dome screen,
wherein the second image projection device is the image projection device according to claim 1, and
the image from the first image projection device and a second diffraction image from the second image projection device are projected on the dome screen in an overlapped manner.

13. The planetarium according to claim 12, further comprising:
a third image projection device,
wherein the third image projection device is a device including a second laser oscillator which outputs a second laser beam and a second diffractive optical element provided on an optical path of the second laser beam output from the second laser oscillator which generates a third diffraction image by diffraction of the second laser beam and projects the third diffraction image based on the second diffractive optical element on a screen, the second diffractive optical element is provided with a first diffraction grating area which generates one diffraction image and a second diffraction grating area which generates another diffraction image, a projection mode switcher which performs mode switching for the projection of the third diffraction image by the second diffractive optical element is included, and a projection mode switched by the projection mode switcher includes a single image mode in which the third diffraction image is projected using only one of the first diffraction grating area and the second diffraction grating area, and an overlapped image mode in which the third diffraction image is projected using both the first diffraction grating area and the second diffraction grating area.

14. A planetarium comprising:
an image projection device; and
a dome screen,
the planetarium that projects an image on the dome screen by the image projection device,
wherein the image projection device is the device according to claim 6.

15. The image projection device according to claim 2, wherein the transparent member is such that the incident surface and the emission surface are not parallel to each other.

16. The image projection device according to claim 2, wherein the number of stages of the diffractive optical element is two.

17. A planetarium comprising:
a dome screen; and
a first image projection device and a second image projection device for projecting an image on the dome screen,
wherein the second image projection device is the image projection device according to claim 2, and
the image from the first image projection device and the diffraction image from the second image projection device are projected on the dome screen in an overlapped manner.

18. The image projection device according to claim 3, wherein the number of stages of the diffractive optical element is two.

19. A planetarium comprising:
a dome screen; and
a first image projection device and a second image projection device for projecting an image on the dome screen,
wherein the second image projection device is the image projection device according to claim 3, and
the image from the first image projection device and the diffraction image from the second image projection device are projected on the dome screen in an overlapped manner.

20. The image projection device according to claim 4, wherein the number of stages of the diffractive optical element is two.

* * * * *